(12) United States Patent
Russell et al.

(10) Patent No.: US 12,063,059 B2
(45) Date of Patent: Aug. 13, 2024

(54) UWB ACCESSORY FOR A WIRELESS DEVICE

(71) Applicant: Motorola Mobility LLC, Chicago, IL (US)

(72) Inventors: Michael E. Russell, Lake Zurich, IL (US); Jarrett K. Simerson, Northbrook, IL (US); Thomas Yates Merrell, St Charles, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 17/579,933

(22) Filed: Jan. 20, 2022

(65) Prior Publication Data

US 2023/0231591 A1 Jul. 20, 2023

(51) Int. Cl.
*H04B 1/38* (2015.01)
*H04W 4/20* (2018.01)
*H04W 4/80* (2018.01)

(52) U.S. Cl.
CPC ............... *H04B 1/38* (2013.01); *H04W 4/20* (2013.01); *H04W 4/80* (2018.02)

(58) Field of Classification Search
CPC .............................. H04W 4/80; H04B 1/3827
See application file for complete search history.

(56) References Cited

U.S. PATENT DOCUMENTS

| 6,677,895 | B1 | 1/2004 | Holt |
| 7,976,386 | B2 | 7/2011 | Tran |
| 8,483,853 | B1 | 7/2013 | Lambourne |
| 9,244,525 | B2 | 1/2016 | Crawford et al. |

(Continued)

FOREIGN PATENT DOCUMENTS

| CN | 107907857 A | 4/2018 |
| CN | 107991647 A | 5/2018 |

(Continued)

OTHER PUBLICATIONS

"[Update] Introducing the New Galaxy SmartTag+: The Smart Way to Find Lost Items", Samsung US Newsroom [online][retrieved Jun. 29, 2021]. Retrieved from the Internet <https://news.samsung.com/US/introducing-the-new-galaxy-smarttag-plus/>., May 11, 2021, 8 Pages.

(Continued)

*Primary Examiner* — Wen W Huang
(74) *Attorney, Agent, or Firm* — FIG. 1 Patents

(57) ABSTRACT

In aspects of UWB accessory for a wireless device, an attachable ultra-wideband (UWB) accessory includes a UWB radio to communicate with UWB radios in an environment. The attachable UWB accessory has one or more wireless interfaces to wirelessly communicate with radio devices of a wireless device to which the UWB accessory is attached. The attachable UWB accessory can also include a micro-controller that receives UWB ranging data from the UWB radios, and may determine a location of the wireless device in the environment based on the UWB ranging data. The attachable UWB accessory may utilize Bluetooth low energy (BLE) for UWB out-of-band communications. A wireless device can be implemented with the attachable UWB accessory, and the wireless device has a BLE interface to interface with the UWB accessory.

20 Claims, 8 Drawing Sheets

(56) References Cited

U.S. PATENT DOCUMENTS

| | | | |
|---|---|---|---|
| 10,158,536 | B2 | 12/2018 | Kim et al. |
| 10,277,981 | B1 | 4/2019 | Frank |
| 10,484,832 | B1 | 11/2019 | Tyagi et al. |
| 10,499,194 | B1 | 12/2019 | Tyagi et al. |
| 10,554,439 | B2 | 2/2020 | Plummer et al. |
| 10,869,166 | B2 | 12/2020 | Tyagi et al. |
| 11,051,260 | B2 | 6/2021 | Gorsica et al. |
| 11,543,530 | B1 | 1/2023 | Liu et al. |
| 11,990,012 | B2 | 5/2024 | Russell et al. |
| 12,004,046 | B2 | 6/2024 | Russell et al. |
| 2007/0254626 | A1 | 11/2007 | Ahlgren |
| 2012/0027194 | A1 | 2/2012 | Deshpande et al. |
| 2013/0310055 | A1 | 11/2013 | Dewing et al. |
| 2014/0057675 | A1 | 2/2014 | Meyers et al. |
| 2014/0073252 | A1* | 3/2014 | Lee .................. H04M 1/72412 455/41.2 |
| 2015/0193036 | A1* | 7/2015 | Yoo ...................... G06F 3/0354 345/173 |
| 2017/0013406 | A1 | 1/2017 | Oliver et al. |
| 2017/0039783 | A1 | 2/2017 | Hobel |
| 2017/0289951 | A1 | 10/2017 | Dey et al. |
| 2018/0045807 | A1 | 2/2018 | Senna et al. |
| 2018/0107446 | A1 | 4/2018 | Wilberding et al. |
| 2018/0302869 | A1 | 10/2018 | Hollar |
| 2019/0132839 | A1 | 5/2019 | Li et al. |
| 2019/0182734 | A1 | 6/2019 | Laliberte |
| 2019/0208270 | A1 | 7/2019 | Bates et al. |
| 2019/0340396 | A1 | 11/2019 | Mills et al. |
| 2020/0037112 | A1 | 1/2020 | Tyagi et al. |
| 2020/0228943 | A1* | 7/2020 | Martin .................... H04W 4/80 |
| 2020/0401365 | A1 | 12/2020 | Wilberding et al. |
| 2021/0063556 | A1 | 3/2021 | Usaj et al. |
| 2021/0064043 | A1 | 3/2021 | Kulkarni et al. |
| 2021/0088456 | A1 | 3/2021 | Asayama et al. |
| 2021/0092563 | A1 | 3/2021 | Hollar et al. |
| 2021/0190940 | A1 | 6/2021 | Troutman |
| 2021/0224492 | A1* | 7/2021 | Eisendle ........... H04W 52/0229 |
| 2021/0241551 | A1 | 8/2021 | Loeshelle |
| 2021/0304577 | A1 | 9/2021 | Hollar et al. |
| 2021/0320681 | A1* | 10/2021 | Baek ...................... H02J 50/402 |
| 2021/0383624 | A1* | 12/2021 | Hoyer ...................... G07C 9/28 |
| 2022/0095120 | A1 | 3/2022 | Panje et al. |
| 2022/0201427 | A1 | 6/2022 | Rechenberger |
| 2022/0244367 | A1 | 8/2022 | Shin et al. |
| 2022/0283321 | A1 | 9/2022 | Ng et al. |
| 2022/0394347 | A1 | 12/2022 | Cheong et al. |
| 2022/0394660 | A1* | 12/2022 | Werner ................. G01S 5/0263 |
| 2023/0075389 | A1 | 3/2023 | Wu et al. |
| 2023/0078485 | A1 | 3/2023 | Russell et al. |
| 2023/0079580 | A1 | 3/2023 | Russell et al. |
| 2023/0168343 | A1 | 6/2023 | Russell et al. |
| 2023/0169839 | A1 | 6/2023 | Russell et al. |
| 2023/0171298 | A1 | 6/2023 | Russell et al. |
| 2023/0184561 | A1 | 6/2023 | Salter et al. |
| 2023/0195411 | A1 | 6/2023 | Lewis et al. |
| 2023/0217210 | A1 | 7/2023 | Russell et al. |
| 2023/0217215 | A1 | 7/2023 | Russell et al. |
| 2024/0031932 | A1 | 1/2024 | Zhang |

FOREIGN PATENT DOCUMENTS

| | | |
|---|---|---|
| CN | 108650623 A | 10/2018 |
| CN | 109725338 A | 5/2019 |
| CN | 109754553 A | 5/2019 |
| CN | 111103611 A | 5/2020 |
| CN | 112911505 A | 6/2021 |
| CN | 113115208 A | 7/2021 |
| CN | 113453147 A | 9/2021 |
| CN | 217643343 U | 10/2022 |
| EP | 3680687 A1 | 7/2020 |
| KR | 102104088 B1 | 4/2020 |
| KR | 102328673 B1 | 11/2021 |
| WO | 2019221800 A1 | 11/2019 |

OTHER PUBLICATIONS

"Car Connectivity Consortium", Car Connectivity Consortium [retrieved Jun. 28, 2021]. Retrieved from the Internet <https://carconnectivity.org/>., Feb. 22, 2018, 6 Pages.

"FiRa Consortium, Inc.", FiRa Consortium, Inc. [retrieved Jun. 28, 2021]. Retrieved from the Internet <https://www.firaconsortium.org/>., Aug. 1, 2019, 3 Pages.

"Tile Bluetooth Tracking Device", Tile Inc. [retrieved Jun. 28, 2021]. Retrieved from the Internet <https://www.thetileapp.com/en-us/how-it-works>., 2012, 18 Pages.

Haselton, Todd, "Here's how Apple's AirTag trackers compare to Tile, and why the company is so upset with Apple", CNBC [online][retrieved Jun. 29, 2021]. Retrieved from the Internet <https://www.cnbc.com/2021/04/27/apple-airtags-versus-tile-tracker-how-they-compare.html>., Apr. 27, 2021, 8 Pages.

Pirch, Hans-Juergen, et al., "Introduction to Impulse Radio UWB Seamless Access Systems", FiRa Consortium [retrieved Jun. 28, 2021]. Retrieved from the Internet <https://www.firaconsortium.org/sites/default/files/2020-04/fira-introduction-impulse-radio-uwb-wp-en.pdf>., Feb. 2020, 15 Pages.

U.S. Appl. No. 17/473,671, "Non-Final Office Action", U.S. Appl. No. 17/473,671, filed Jul. 14, 2023, 6 pages.

GB2216213.5, "Combined Search and Examination Report", GB Application No. GB2216213.5, Apr. 28, 2023, 10 pages.

U.S. Appl. No. 17/536,535, "Non-Final Office Action", U.S. Appl. No. 17/536,535, filed Apr. 18, 2023, 20 pages.

U.S. Appl. No. 17/536,636, "Non-Final Office Action", U.S. Appl. No. 17/536,636, filed Mar. 3, 2023, 12 pages.

Cheong, Minho, et al., "US Provisional Application as Filed", U.S. Appl. No. 63/197,867, filed Jun. 7, 2021, 68 pages.

GB2213053.8, "Combined Search and Examination Report", GB Application No. GB2213053.8, Feb. 23, 2023, 10 pages.

GB2213121.3, "Search Report", GB Application No. GB2213121.3, Mar. 9, 2023, 5 pages.

U.S. Appl. No. 17/473,477, "Non-Final Office Action", U.S. Appl. No. 17/473,477, filed Sep. 14, 2023, 12 pages.

U.S. Appl. No. 17/536,535, "Final Office Action", U.S. Appl. No. 17/536,535, filed Aug. 11, 2023, 25 pages.

U.S. Appl. No. 17/536,636, "Non-Final Office Action", U.S. Appl. No. 17/536,636, filed Jul. 13, 2023, 14 pages.

U.S. Appl. No. 63/261,929, "Provisional Application", U.S. Appl. No. 63/261,929, filed Sep. 30, 2021, 62 pages.

U.S. Appl. No. 17/473,477, "Final Office Action", U.S. Appl. No. 17/473,477, filed Dec. 29, 2024, 5 pages.

U.S. Appl. No. 17/473,671, "Notice of Allowance", U.S. Appl. No. 17/473,671, filed Jan. 24, 2024, 7 pages.

U.S. Appl. No. 17/536,535, "Non-Final Office Action", U.S. Appl. No. 17/536,535, filed Dec. 29, 2023, 26 pages.

U.S. Appl. No. 17/536,636, "Corrected Notice of Allowability", U.S. Appl. No. 17/536,636, filed Jan. 19, 2024, 3 pages.

U.S. Appl. No. 17/536,636, "Notice of Allowance", U.S. Appl. No. 17/536,636, filed Jan. 10, 2024, 9 pages.

U.S. Appl. No. 17/566,530, "Non-Final Office Action", U.S. Appl. No. 17/566,530, filed Nov. 9, 2023, 14 pages.

U.S. Appl. No. 17/473,477, "Advisory Action", U.S. Appl. No. 17/473,477, Feb. 12, 2024, 3 pages.

U.S. Appl. No. 17/473,671, "Corrected Notice of Allowability", U.S. Appl. No. 17/473,671, Mar. 27, 2024, 2 pages.

U.S. Appl. No. 17/536,499, "Non-Final Office Action", U.S. Appl. No. 17/536,499, Mar. 22, 2024, 13 pages.

U.S. Appl. No. 17/536,535, "Notice of Allowance", U.S. Appl. No. 17/536,535, Apr. 10, 2024, 7 pages.

U.S. Appl. No. 17/536,636, "Corrected Notice of Allowability", U.S. Appl. No. 17/536,636, Feb. 5, 2024, 3 pages.

U.S. Appl. No. 17/566,530, "Final Office Action", U.S. Appl. No. 17/566,530, Feb. 16, 2024, 16 pages.

U.S. Appl. No. 17/473,477, "Non-Final Office Action", U.S. Appl. No. 17/473,477, Apr. 8, 2024, 6 pages.

U.S. Appl. No. 17/473,671, "Corrected Notice of Allowability", U.S. Appl. No. 17/473,671, May 6, 2024, 2 pages.

(56) References Cited

OTHER PUBLICATIONS

U.S. Appl. No. 17/536,535, "Corrected Notice of Allowability", U.S. Appl. No. 17/536,535, Apr. 24, 2024, 2 pages.
U.S. Appl. No. 17/536,535, "Corrected Notice of Allowability", U.S. Appl. No. 17/536,535, May 3, 2024, 2 pages.
U.S. Appl. No. 17/536,636, "Corrected Notice of Allowability", U.S. Appl. No. 17/536,636, Apr. 17, 2024, 3 pages.
U.S. Appl. No. 17/566,530, "Non-Final Office Action", U.S. Appl. No. 17/566,530, Jun. 10, 2024, 17 pages.

\* cited by examiner

UWB ACCESSORY FOR A WIRELESS DEVICE

BACKGROUND

Ultra-wideband (UWB) is a radio technology that can be utilized for secure, spatial location applications using very low energy for short-range, high-bandwidth communications. The technology is detailed by the IEEE 802.15.4z standard for Enhanced Ultra-Wideband (UWB) Physical Layers (PHYs) and Associated Ranging Techniques for accurate relative position tracking, which provides for applications using relative distance between entities. Notably, UWB utilizes double-sided, two-way ranging between devices and provides for highly precise positioning, within 10 cm of ranging accuracy in as little as three degrees of precision through time-of-flight (ToF) and angle-of-arrival (AoA) measurements at up to 100 m through the use of impulse radio communications in the 6-10 GHz frequency range. The positioning is an accurate and secure technology using the scrambled timestamp sequence (STS), cryptographically secure pseudo-random number generation, and other features of the UWB PHY.

BRIEF DESCRIPTION OF THE DRAWINGS

Implementations of the techniques for UWB accessory for a wireless device are described with reference to the following Figures. The same numbers may be used throughout to reference like features and components shown in the Figures.

DETAILED DESCRIPTION

Figure 1:
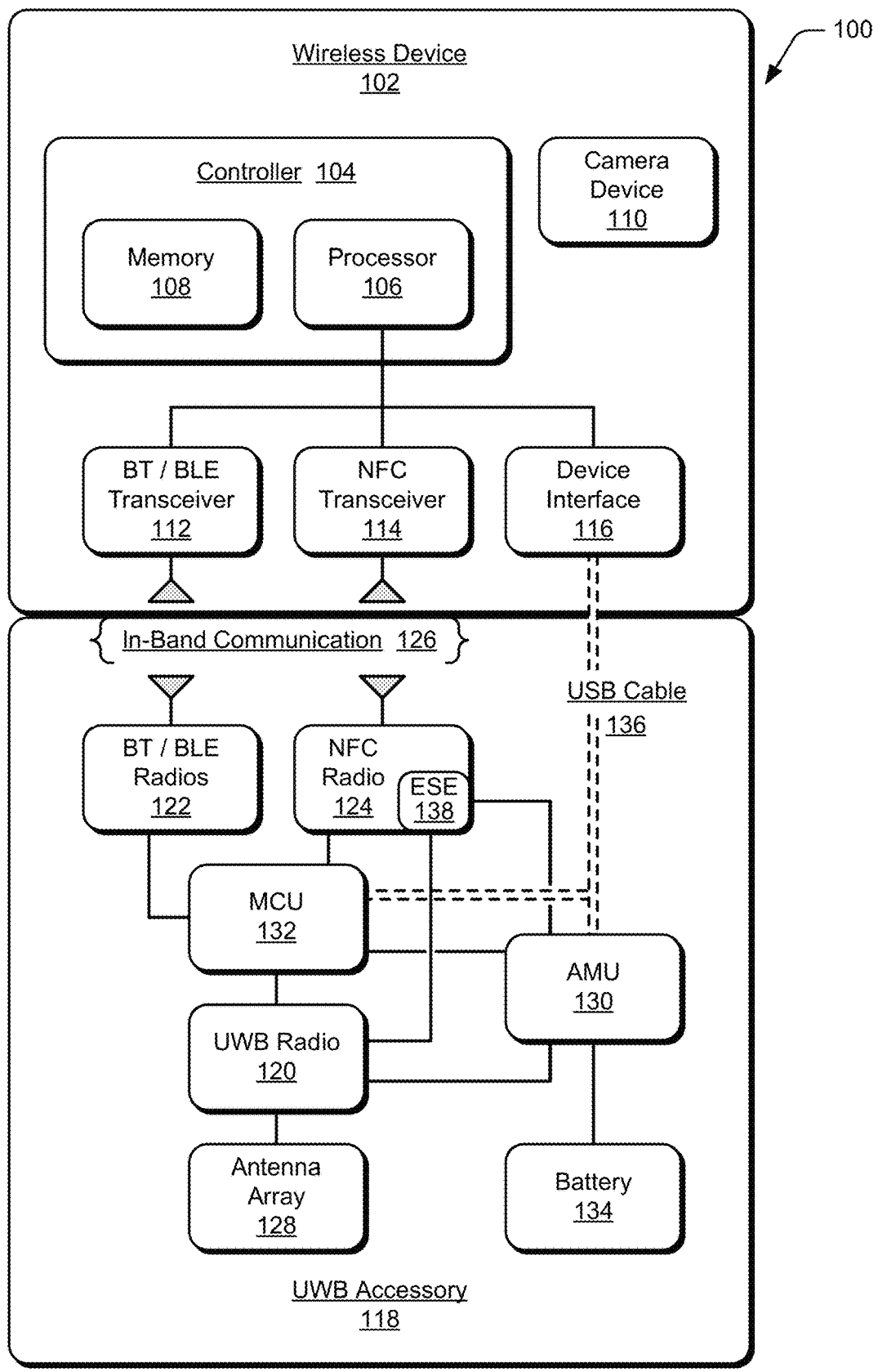
FIG. 1 illustrates an example system with a UWB accessory for a wireless device in accordance with one or more implementations as described herein.

Implementations of techniques for a UWB accessory for a wireless device are implemented as described herein. A UWB accessory can be attached to a wireless device, such as a smartphone, mobile phone, or any other type of mobile wireless device, and the UWB accessory enables the wireless device for UWB communications. Any type of mobile and/or wireless device can be updated and configured for UWB communications with the addition of the UWB accessory that includes a UWB radio. The UWB accessory is attachable to the wireless device, such as in the form of an accessory case for the device, or as some other type of attachable unit. In implementations, the UWB accessory may also be operable when detached from the wireless device and/or when the UWB accessory is proximate a location of the wireless device.

In aspects of the described techniques, the UWB accessory is implemented with a UWB radio and additionally can include Bluetooth (BT) and/or BLE radios, as well as an NFC radio. The UWB accessory expands a wireless device capabilities and facilitates communication of UWB ranging data (e.g., ToF and AoA data). The UWB accessory can also interface and/or communicate with the wireless device using BLE for in-band communication. Given that BLE is implemented in most all smartphones, BLE is readily available to interface between a mobile wireless device and the UWB accessory. A wireless device and the UWB accessory can communicate through BLE to provide accurate ranging updates for device applications, such as for augmented reality (AR) and/or for other use cases.

In implementations, the UWB accessory can be provisioned and associated with a user of a wireless device while the accessory is attached to the wireless device. Additionally, the UWB accessory can be configured for attachment to a different wireless device, and the attachable UWB accessory is provisioned and associated with a user of the different wireless device while the accessory is attached to the different wireless device. Further, the UWB accessory is also detachable from a wireless device and can be operable as a key fob or security badge while detached from the device. Generally, UWB-enabled smart devices, such as smartphones and home automation devices, can be used to determine spatial awareness that provides features implemented in smart homes and buildings with access control, security, location-based services, and peer-to-peer applications.

Generally, media devices and/or other devices can be objects in an environment that may be implemented with a UWB radio for UWB communications. In other implementations, UWB tags include a UWB radio and can be located for association with respective objects in an environment, to include non-UWB-enabled devices, and each UWB tag can be identified with a digital label indicative of the association with one or more tagged objects. As described herein, an object in the environment can include tagged objects, as well as non-tagged objects, and may be any type of a smart device, mobile device, wireless device, electronic device, media device, or a non-communication-enabled, static object or device.

In implementations, one or more of the UWB radios may be UWB tags located for association with a respective object, general device, smart device, mobile device, wireless device, electronic device, and/or media device. A UWB tag may be located for association with any type of device or other object in the environment, and the UWB tag can determine an identity of the associated device based on a Bluetooth MAC ADDR and/or other device identifying information communicated from a smart device, media device, or other object. Generally, the tagging of a respective object (to include any type of device) in the environment is a function of identifying a position or location of the object in the environment, and attaching a semantic label to the UWB radio of a UWB tag that is located and associated with the respective object.

The described techniques can utilize UWB ranging data, such as time-of-flight (ToF), angle-of-arrival (AoA), and/or time-difference-of-arrival (TDoA), as well as Wi-Fi and/or Bluetooth RSSI measurements, and optionally camera imaging, to determine UWB radio and UWB tag locations in the environment. The UWB precise location positioning capabilities is utilized to enable location detection of the UWB radios and UWB tags at particular locations in the environment, which can then be used to enhance the wireless and digital experience in a smart home environment by utilizing the precise and secure location positioning features.

While features and concepts of the described techniques for a UWB accessory for a wireless device can be implemented in any number of different devices, systems, environments, and/or configurations, implementations of the techniques for a UWB accessory for a wireless device are described in the context of the following example devices, systems, and methods.

FIG. 1 illustrates an example system 100 with a UWB accessory for a wireless device, as described herein. The system 100 includes a wireless device 102, such as a smartphone, mobile phone, or any other type of mobile wireless device. The wireless device 102 can be implemented with various components, such as a controller 104 with a processor 106 and memory 108, as well as any number and combination of different components as further described with reference to the example device shown in FIG. 8. The wireless device 102 may also include an integrated camera device 110, such as further shown and described with reference to FIG. 2. In implementations, the wireless device 102 includes various radios for wireless communication with other devices and/or wireless communication radios. For example, the wireless device 102 includes a Bluetooth (BT) and/or Bluetooth Low Energy (BLE) transceiver 112 and a near field communication (NFC) transceiver 114. The wireless device 102 may also include a Wi-Fi radio, a GPS radio, and/or any other type of device interfaces 116, such as a USB plug-in or interface.

The system 100 also includes a UWB accessory 118 that can be attached to the wireless device 102, enabling the wireless device for UWB communications. Any type of mobile and/or wireless device can be updated and configured for UWB communications with the addition of the UWB accessory 118 that includes a UWB radio 216. The UWB accessory 118 is attachable to the wireless device 102, such as in the form of an accessory case for the device, or as some other type of attachable unit. In implementations, the UWB accessory 118 may also be operable when detached from the wireless device and/or when the UWB accessory is proximate a location of the wireless device.

The UWB accessory 118 is implemented with the UWB radio 216 and additionally can include Bluetooth (BT) and/or BLE radios 122, as well as an NFC radio 124. The UWB accessory 118 expands the wireless device 102 capabilities and facilitates communication of UWB ranging data (e.g., ToF and AoA data). The UWB accessory 118 can also interface and/or communicate with the wireless device 102 using BLE for in-band communication 126. Given that BLE is implemented in most all smartphones (e.g., the BLE transceiver 112), BLE is readily available to interface between a mobile wireless device and the UWB accessory 118. The UWB protocol is designed to utilize out-of-band communications that are generally low-power, wireless protocols for UWB device discovery and UWB session configuration, such as via Bluetooth or BLE, which uses less power than a UWB radio used alone. Utilizing out-of-band communications for UWB ranging sessions keeps power consumption lower. Additionally, using BLE for UWB out-of-band communications provides for a large network effect given the number of devices that are already BLE-enabled.

The wireless device 102 and the UWB accessory 118 can communicate through BLE to provide accurate ranging updates for device applications, such as for augmented reality (AR) and/or for other use cases. The UWB accessory 118 includes an antenna array 128 for wireless communication reception and transmission (e.g., UWB ranging data), an AMU 130, and a microcontroller unit (MCU) 132 that runs the UWB, NFC, and BLE stack for digital key and ranging operations. Upon pairing and digital key (DK) applet setup, the UWB accessory 118 can be used in a low power DK mode when removed or detached from the wireless device 102, and may be operable as a key fob or a security badge for vehicle or building access. The UWB accessory 118 can also include a battery 134 (e.g., a power source) and/or a USB cable (USB-PD) 136 to power the UWB accessory. For example, the UWB accessory 118 may include any type of a power source to power the device, such as a rechargeable battery and/or any other type of active or passive power source that may be implemented in an electronic, computing, and/or communication device. Alternatively or in addition, that the NFC transceiver 114 of the wireless device 102 can operate in a mode to charge the UWB accessory 118 through the NFC radio (and antenna subsystem) 124.

In implementations, the UWB accessory 118 can be initiated or started by attaching it to the wireless device 102, which interfaces the accessory with the device via the USB cable 136 and/or by contactless interfacing via the in-band communication. Alternatively, the UWB accessory 118 can be initiated by NFC detection, or by a user-initiated activation of a selectable button or control. When the UWB accessory 118 interfaces with the wireless device 102 and is initiated, the BLE pairing and key credential transferring (e.g., for an applicable wallet application or applet) can be provisioned through an application on the wireless device. The NFC radio 124 as implemented on the UWB accessory 118 is utilized because it contains the embedded secure element 138 that can be used for key storage for digital access, such as would be needed for the CCC digital key for vehicle access. The "wallet" or key application on the wireless device 102 can setup the UWB accessory 118 to be the means of gaining secure access to a vehicle or digital lock, such as in a home or workplace environment. As a UWB tag in an environment, the UWB accessory 118 provides a tag for user dynamic association of the user with the wireless device.

As further described throughout this disclosure, the UWB accessory 118 may generally be located in an environment with the wireless device 102, and the environment can include computing devices, media devices, objects, UWB tags, and other UWB-enabled devices implemented with a UWB radio for communication utilizing UWB, as well as any number of the other types of electronic, computing, and/or communication devices as described herein. The UWB accessory 118 includes the UWB radio 216 to communicate with UWB radios associated with respective devices in the environment. In an implementation, the micro-controller (MCU) 132 of the UWB accessory 118 can receive UWB ranging data from the other UWB radios in the environment and determine a corresponding location of the wireless device 102 in the environment.

The UWB accessory 118 can be provisioned and associated with a user of the wireless device 102 while the accessory is attached to the wireless device. Additionally, the UWB accessory 118 can be configured for attachment to a different wireless device, and the attachable UWB accessory is provisioned and associated with a user of the different wireless device while the accessory is attached to the different wireless device. As indicated above, the UWB accessory 118 is also detachable from the wireless device 102 and can be operable as a key fob or security badge while detached from the wireless device.

Figure 2:
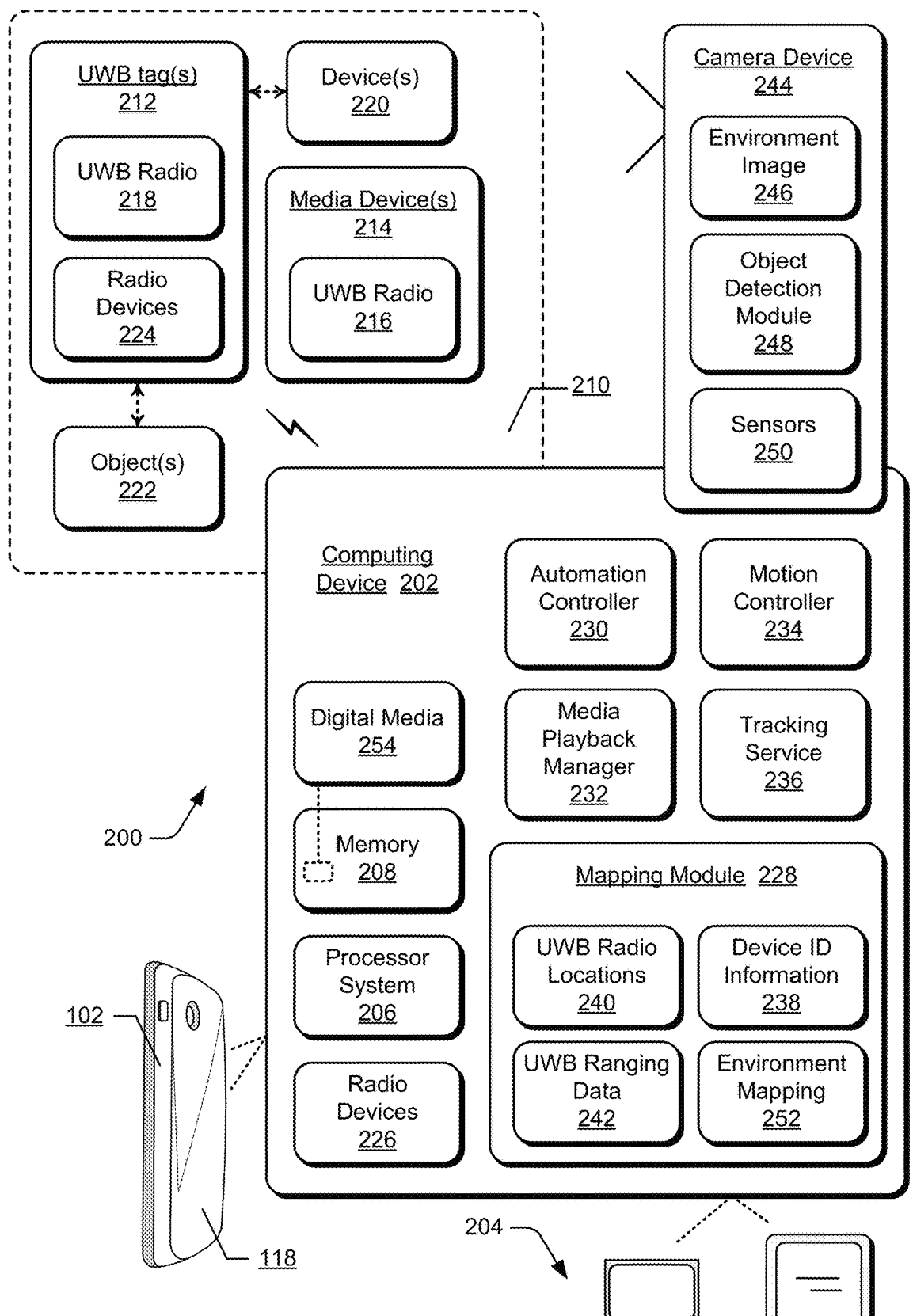
FIG. 2 illustrates example devices and features for UWB accessory for a wireless device in accordance with one or more implementations as described herein.

FIG. 2 illustrates an example system 200 with a UWB accessory for a wireless device, as described herein. Generally, the system 200 includes a computing device 202, which is an example of the wireless device 102 with the attachable UWB accessory 118, such as a smartphone, mobile phone, or other type of mobile wireless device. Alternatively or in addition, the system 200 can include the computing device 202 as any type of an electronic, computing, and/or communication device 204, such as a computer, a laptop device, a desktop computer, a tablet, a wireless device, a camera device, a smart device, a media device, a smart display, a smart TV, a smart appliance, a home automation device, and so forth. The computing device 202 can be implemented with various components, such as a processor system 206 and memory 208, as well as any number and combination of different components as further described with reference to the example device shown in FIG. 8.

In implementations, the wireless device 102 may be communicatively linked, generally by wireless connection, to UWB radios of UWB tags and/or to other UWB-enabled devices for UWB communication in an environment 210. Generally, the environment 210 can include the computing device 202, the wireless device 102, media devices, objects, the UWB tags 212, and other UWB-enabled devices implemented with a UWB radio for communication utilizing UWB, as well as any number of the other types of electronic, computing, and/or communication devices 204 described herein. The wireless UWB communications in the environment 210 are similar between the UWB tags 212 and/or other UWB-enabled devices, such as the media devices 214, in the environment. The UWB tags 212 can be placed in the environment proximate each of the objects and other devices, and then labeled with a functional name to indicate a UWB tag association with a particular object and/or device. Given the angular precision and centimeter accurate ranging that UWB provides, location detection of UWB radios and UWB tags 212 at particular locations in the environment 210 can be used to enhance the wireless and digital experience in a smart home environment.

In this example system 200, the media devices 214 may be enabled for UWB communications with an embedded UWB radio 216. Alternatively, a UWB tag 212 having a UWB radio 218 may be associated with any other types of devices 220 that are not UWB-enabled in the environment 210. Similarly, a UWB tag 212 may be associated with any type of object 222 in the environment, to include any type of a smart device, media device, mobile device, wireless device, and/or electronic device, as well as associated with a static object or device that is not enabled for wireless communications. For example, the UWB tags 212 can be positioned and located in the environment 210 for association with respective devices and/or objects, and each UWB tag 212 can be identified with a digital label indicative of the association with one or more of the objects 222 and/or devices 220 in the environment. For example, an object 222 may be a smart TV in a home environment, and the digital label of the UWB tag 212 indicates "smart TV" as the identifier of the UWB tag association. Similarly, an object 222 may be a floor lamp in the home environment, and the digital label of the UWB tag 212 indicates "floor lamp" as the identifier of the UWB tag association. Notably, the tagging is a function of identifying a position of an object 222 or a device 220, and attaching a semantic label (e.g., "TV", "lamp", "chair", etc.) to the UWB radio 218 of the UWB tag 212 that is located and associated with a respective object or device.

In some instances, one or more of the media devices 214, the other devices 220, and/or the objects 222 in the environment 210 may already be UWB-enabled with a UWB radio 216 for wireless communication with the other devices and with the UWB tags 212 in the environment. The wireless UWB communications for mapping objects 222 and/or devices 220 in the environment 210 are similar between the UWB tags 212 and/or the UWB-enabled media devices 214 in the environment. A network of the UWB tags 212 in the environment 210 can discover and communicate between themselves and/or with a control device or controller logic that manages the devices 220 and UWB tags in the environment. In implementations, a UWB tag 212 can be used at a fixed location to facilitate accurate location, mapping, and positioning of inanimate objects and/or areas in the environment 210.

The UWB protocol is designed to utilize out-of-band communications that use low-power, wireless protocols for UWB device discovery and UWB session configuration, such as via Bluetooth or Bluetooth Low Energy (BLE), which uses less power than if a UWB radio was used alone. Additionally, using BLE for UWB out-of-band communications provides for a large network effect given the number of devices that are already BLE-enabled. Because BLE is able to receive and decode advertising packets, the UWB tags 212 placed in the environment 210 proximate a device, for example, can determine the nearest Bluetooth MAC ADDR and likely an indication of the device name of the nearby device. When the nearest device name is not advertised, the UWB tag can check against the BD ADDR that is already known on the computing device 202, which is also particularly useful if privacy settings are enabled and an identity resolving key is not available on the UWB Tag.

Alternatively or in addition to a UWB tag 212 receiving address and device identifying information from nearby devices (to include media devices), and then identifying the device 220, the computing device 202 can communicate with the UWB tags 212 and the UWB radios of other devices in the environment, and receive Bluetooth or BLE advertised communications from the UWB tags and UWB radios of the devices. The computing device 202 may be a centralized controller and/or a mobile device in the environment that correlates a UWB tag 212 with a nearby device 220 based on RSSI measurements of the Bluetooth or BLE advertised communications from the UWB tags and devices. For example, the computing device 202 can receive advertised signals from a UWB tag 212 or other UWB-enabled device, and compare the signal path loss from the received signals to determine that the UWB tag and device are proximate each other in the environment 210 based on similar signal path loss.

In aspects of the described features, user interaction can be minimized or eliminated as the UWB tags 212 are implemented to automate identification and labeling, such as by using Bluetooth or BLE communications and/or captured images. For example, when a UWB tag 212 is located for association with a device 220 in the environment 210, the UWB tag can determine an identity of the device based on a Bluetooth MAC ADDR and/or other device identifying information communicated from the device. Additionally, the UWB tag 212 can utilize received Wi-Fi or Bluetooth RSSI measurements in conjunction with the UWB positioning information to generate and sort a list of nearby devices, and select the MAC ADDR of the device closest to the UWB tag. Further, in an environment that includes the computing device 202, such as a mobile phone, smartphone, as wireless device 102, or other wireless device that has a network association with the device 220 or a media device 214, the UWB tag 212 that is located for association with the device 220 in the environment can receive an identity of the device from the computing device.

In this example system 200, a UWB tag 212 is generally representative of any UWB tag or device with embedded UWB in the environment 210, and can include various radios for wireless communications with other devices and/or with the other UWB tags in the environment. For example, the UWB tag 212 can include a UWB radio 218 and other radio devices 224, such as a Bluetooth radio, a Wi-Fi radio, and/or a global positioning system (GPS) radio implemented for wireless communications with the other devices and UWB tags in the environment 210. The computing device 202 also includes various radios for wireless communication with the media devices 214, other devices 220, and/or with the UWB tags 212 in the environment. For example, the computing device 202 includes radio devices 226, such as a Bluetooth radio, a Wi-Fi radio, and a GPS radio implemented for wireless communications with the other devices and UWB tags 212 in the environment 210. Additionally, as an example of the computing device 202, the UWB accessory 118 of the wireless device 102 includes the UWB radio 120 for wireless communications with the other devices and UWB tags 212 in the environment 210. In alternate implementations, the computing device 202 may also include an integrated UWB radio for wireless communications with the other devices and UWB tags 212 in the environment.

In implementations, the computing device 202, media devices 214, other devices 220, and/or the UWB tags 212 may include any type of positioning system, such as a GPS transceiver or other type of geo-location device, to determine the geographical location of a UWB tag, device, and/or the computing device. Notably, any of the devices described herein, to include components, modules, services, computing devices, camera devices, and/or the UWB tags, can share the GPS data between any of the devices, whether they are GPS-hardware enabled or not. Although the resolution of global positioning is not as precise as the local positioning provided by UWB, the GPS data that is received by the GPS-enabled devices can be used for confirmation that the devices are all generally located in the environment 210, which is confirmed by the devices that are also UWB-enabled and included in the environment mapping. Other objects and devices, such as a smart TV, smart home appliance, lighting fixture, or other static, non-communication-enabled objects, may not be GPS-hardware enabled, yet are included in the environment mapping based on the UWB tag and UWB radio associations with the respective objects and devices. The GPS location of these other objects and devices can be determined based on their relative position in the environment 210 and their proximity to the GPS-enabled devices. Accordingly, changes in location of both GPS-enabled devices and non-GPS devices and objects can be tracked based on global positioning and local positioning in the environment.

The computing device 202 can also implement any number of device applications and/or modules, such as any type of a messaging application, communication application, media application, and/or any other of the many possible types of device applications or application modules. In this example system 200, the computing device 202 may implement any one or combination of a mapping module 228, an automation controller 230, a media playback manager 232, a motion controller 234, and a tracking service 236, each of which may include independent processing, memory, and/or logic components functioning as a computing and/or electronic device integrated with the computing device 202. Alternatively or in addition, any of the mapping module 228, automation controller 230, media playback manager 232, motion controller 234, and tracking service 236 can be implemented in software, in hardware, or as a combination of software and hardware components. In this example, each of the mapping module 228, automation controller 230, media playback manager 232, motion controller 234, and tracking service 236 are implemented as a software application or module, such as executable software instructions (e.g., computer-executable instructions) that are executable with a processor (e.g., with the processor system 206) of the computing device 202 (e.g., wireless device 102) to implement the techniques and features described herein.

As a software application or module, the mapping module 228, automation controller 230, media playback manager 232, motion controller 234, and/or tracking service 236 can be stored on computer-readable storage memory (e.g., the memory 208 of the device), or in any other suitable memory device or electronic data storage implemented with the module. Alternatively or in addition, any one or more of mapping module 228, automation controller 230, media playback manager 232, motion controller 234, and tracking service 236 may be implemented in firmware and/or at least partially in computer hardware. For example, at least part of the modules may be executable by a computer processor, and/or at least part of the modules may be implemented in logic circuitry.

As described above, a UWB tag 212 that is located for association with a device 220 in the environment 210 can determine an identity of the device based on a Bluetooth MAC ADDR and/or other device identifying information communicated from the device. Generally, the UWB tags 212 can scan to receive device identifying information 238 communicated from nearby devices 220 in the environment. The device identifying information 238 can be communicated via Bluetooth or BLE from the devices as a device name, a Bluetooth MAC ADDR, and a received signal strength indication (RSSI). The UWB tag 212 can identify the device 220 that is located nearest to the UWB tag based on the device identifying information 238 received from the devices, and generate an ordered list of the devices based on the device identifying information to identify the device that is located nearest to the UWB tag. Additionally, the mapping module 228 implemented by the computing device 202 can receive the device identifying information 238 communicated from the devices 220 and media devices 214 in the environment, as well as UWB tag identifiers communicated from the UWB tags 212 as a type of the device identifying information 238 in the environment.

In other implementations, and as described above, the computing device 202 can communicate with the UWB tags 212, UWB radios 216, 218, and with the other devices 220 in the environment 210, receiving Bluetooth or BLE advertised communications from the UWB tags and devices. The computing device implements the mapping module 228, which can correlate a UWB tag 212 with a nearby device 220 based on RSSI measurements of the Bluetooth or BLE advertised communications from the UWB tags and devices. For example, the computing device 202 can receive advertised signals from the UWB tags 212, from the UWB radios 216, 218, and/or from the devices 220. The mapping module 228 compares the signal path loss from the received signals to determine which of the UWB tags, UWB radios, and devices are proximate each other based on similar signal path loss. The mapping module 228 can also associate a UWB tag with a nearby device or media device, and communicate the association back to the UWB tag, such as via in-band UWB communications.

As noted above, the example system 200 includes the UWB tags 212 located for association with respective devices 220 and objects 222 in the environment 210, and the objects can include both tagged objects, as well as non-tagged objects. In aspects of the described techniques, the mapping module 228 implemented by the computing device 202 can determine the location of each of the tagged objects and devices in the environment 210 based on a position of a UWB tag 212 associated with a tagged object or device. The mapping module 228 can also determine a location of each of the objects, devices, and non-tagged objects based on the UWB radio locations 240 in the environment.

In implementations, the mapping module 228 can determine the UWB radio location 240 of each of the UWB tags 212 and UWB radios in the environment 210, and determines the relative positions of each of the UWB radios with respect to each other. The mapping module 228 can obtain UWB ranging data 242, such as time-of-flight (ToF), angle-of-arrival (AoA), and/or time-difference-of-arrival (TDoA) data, as received from the UWB tags 212 and UWB radios via in-band session exchanges with the UWB radio 120 of the UWB accessory 118 of the wireless device 102. The time-of-flight (ToF) is a two-way communication between a UWB tag 212 and another device, while the time-difference-of-arrival (TDoA) is one-way communication, where a UWB tag 212 communicates a signal but does not need to wait for a reply, such as from the computing device 202. The mapping module 228 may also receive and utilize other communication data that is shared over Bluetooth or BLE, such as relative position data shared between UWB devices. The mapping module 228 can then determine the location and the relative position of each of the UWB tags 212 and UWB radios in the environment 210 based on the UWB ranging data 242.

The mapping module 228 can also determine environment and object dimensions in the environment 210 based on the location and a relative position of each tagged object and non-tagged object in the environment. For example, the mapping module 228 can triangulate the wireless device 102 and two of the UWB tags 212 to determine a length and a width of the environment. The mapping module 228 can also determine an initial elevation of the wireless device 102 and a subsequent elevation of the wireless device in the environment 210, and then determine a volume of the environment based on the area of the environment and an elevation delta between the initial elevation and the subsequent elevation of the wireless device.

Although the mapping module 228 is shown and described as being implemented by the computing device 202 in the environment 210, any of the other computing devices in the environment may implement the mapping module 228 and/or an instantiation of the mapping module. For example, the system 200 includes a camera device 244, which may be an independent electronic, computing, and/or communication device in the environment 210, and the camera device 244 can implement the mapping module 228. Similarly, a control device or controller logic in the environment 210 can implement the mapping module, as well as a UWB tag 212 may implement the mapping module 228 in the environment.

In this example system 200, the camera device 244 may be implemented as a security camera, indoor environment camera, a doorbell camera, a mobile device camera, a camera integrated with a computing device or a media device, and the like. Generally, the camera device 244 may be implemented with any number and combination of the components described with reference to the computing device 202, where the camera device 244 can include an integrated UWB radio, as well as independent processing, memory, and/or logic components functioning as a computing and camera device. Alternatively, the camera device 244 may be implemented as a component of the computing device 202, such as in a mobile phone, in the wireless device 102, or in any other type of wireless and/or computing device to facilitate image capture.

The camera device 244, such as any type of a security camera, indoor environment camera, a doorbell camera, a mobile device camera, a camera integrated with a computing device or a media device, or a camera device of the computing device 202, can be utilized to further implement the features and techniques described herein. The camera device 244 can be used to capture an image 246 of the environment 210 (or a region of the environment), and the camera device implements an object detection module 248 utilized to identify the media devices 214, other devices 220, and/or the objects 222 in the environment from the captured image. Similar to the other computing device modules and components, the object detection module 248 may include independent processing, memory, and/or logic components functioning as a computing and/or electronic device integrated with the camera device 244 and/or with the computing device 202. Alternatively or in addition, the object detection module 248 can be implemented in software, in hardware, or as a combination of software and hardware components. In this example, the object detection module 248 is implemented as a software application or module, such as executable software instructions (e.g., computer-executable instructions) that are executable with a device processor and stored on computer-readable storage memory (e.g., on memory of the device).

In implementations, the camera device 244 may also include various sensors 250, such as an infra-red (IR) time-of-flight (TOF) sensor that can be used in conjunction with the described techniques utilizing UWB. An advantage of utilizing UWB with the UWB tags 212 over conventional IR TOF is that UWB can still be used to perform ranging when occluded by objects, such as a wall or object in the environment 210 that blocks IR, and for objects that may not be viewable in the captured environment images. However, IR TOF of the camera device 244 may still be utilized in conjunction with the techniques described herein.

In aspects of environment and object mapping, the camera device 244 and the object detection module 248 can be used to identify the objects 222 (e.g., to include the media devices 214 and other devices 220) in the environment 210 from a captured environment image 246. The mapping module 228 can then determine the location and the relative position of each of the tagged objects and the non-tagged objects in the environment based on the UWB tags 212 and the identified objects and devices in the environment. In implementations, the mapping module 228 can generate an environment mapping 252, such as a location association map, that is generally a floor plan of a building or smart-home environment, including the locations of the objects and devices in the building. The floor plan can be generated in a three-dimension coordinate system of the environment 210 including positions of the walls of the building as determined from the captured image. An example of a location association map showing the location of the devices and/or the objects in the environment 210 is further shown and described with reference to FIGS. 2 and 3.

In implementations, the mapping module 228 can also generate the environment mapping 252 as an environment depth map showing the relative location of the objects 222 and devices in the environment. As described herein, an object 222 in the environment may be any type of a smart device, general device, media device, mobile device, wireless, and/or electronic device, as well as a non-communication-enabled, static object or device. The environment depth map can be generated by comparing spatial distances between the objects identified by the object detection module 248 that appear in the captured environment image 246 and the UWB ranging data 242 received from one or more of the UWB tags 212 in the environment. As noted above, the UWB tags 212 can be used to perform ranging when occluded by objects, such as a wall or object in the environment 210 that blocks IR and for objects that may not be viewable in the captured environment images. However, IR TOF implemented as a sensor 156 of the camera device 244 may still be utilized in conjunction with the techniques described herein. An example of an environment depth map showing the location of the devices and/or the objects in the environment 210 is further shown and described with reference to FIG. 5.

As a device application implemented by the computing device 202, the mapping module 228 may have an associated application user interface that is generated and displayable for user interaction and viewing, such as on a display screen of the wireless device 102. Generally, an application user interface, or any other type of video, image, graphic, and the like is digital image content that is displayable on the display screen of the wireless device 102. The mapping module 228 can generate and initiate to display the environment mapping 252 in the user interface on the display screen of the wireless device 102 for user viewing in the environment.

In conjunction with the mapping module 228, the tracking service 236 implemented by the computing device 202 can receive initial location data for the media devices 214, other devices 220, and/or the objects 222 from each of the UWB tags 212 and/or the UWB radios 216, 218 that are associated with the devices and the objects. The tracking service 236 can receive the initial location data for the devices and/or the objects as any type of positioning system data, such as GPS data via a GPS radio of the computing device. An object or device that is a smart device and GPS-enabled can communicate its own GPS data to an associated UWB tag 212, which can then communicate the GPS data to the computing device 202.

The tracking service 236 can generate an object identity database in which each of the media devices 214, other devices 220, and/or the objects 222 are identified by their respective initial location data (e.g., as determinable from UWB radio locations 240). Notably, the media devices 214, other devices 220, and/or the objects 222 can each be identified in the object identity database by only the initial location data, without additional device identifying information. Further, the initial location data that identifies the media devices 214, other devices 220, and/or the objects 222 can be communicated to a cloud-based network system for object tracking, without exposing any other device identifying information of the devices and/or the objects.

The tracking service 236 can also monitor for movement of a media device 214, another device 220, and/or an object 222 that is identified by the initial location data based on subsequent positioning data associated with the device or object. The tracking service 236 can receive the subsequent positioning data associated with a device or object as updated GPS data, and determine movements of the device or object based on the updated GPS data. Further, the tracking service 236 can determine updated location data associated with a media device 214, another device 220, and/or an object 222 based on the subsequent positioning data, and update an identity of the device or the object in the object identity database using the updated location data.

In aspects of object and device tracking, such as based on the UWB tags and/or UWB radios, the tracking service 236 can monitor the movements of the devices and objects for a security determination as to an unauthorized relocation of a device or object. The tracking service 236 can also monitor the movements of the devices and/or the objects for a cluster of multiple devices or objects moving together in an unauthorized manner, and for an abnormal proximity of multiple devices and/or objects in the environment. Generally, devices in the environment 210, such as a mobile phone or laptop computer, will likely be moved around the environment, as well as in and out of the environment, by the user of the devices. However, other types of devices, such as a smart TV and sound system components, generally remain static in the environment. If the tracking service 236 determines that many or all of the devices are moving and being abnormally clustered together, this may indicate a malicious event, such as a robbery.

As a device application, the tracking service 236 may have an associated application user interface that is generated and displayable for user interaction and viewing, such as on a display screen of the wireless device 102. As part of a security system, the tracking service 236 can be implemented to initiate notifications based on determined, unauthorized movements and/or abnormal proximity of multiple devices and/or objects in the environment. For example, a notification may be displayed on the display screen of the wireless device 102, and in a system that includes camera devices in the environment, the camera devices can be initiated to capture images of the environment in an effort to also capture an image of unauthorized persons in the area. The user of the wireless device 102 (e.g., a mobile phone) may also override any such warnings or notifications, such as if the user is moving furniture and other items in the environment.

The media playback manager 232 can be implemented by the computing device 202 for aspects of digital media playback based on the UWB radios in the environment 210. The media playback manager 232 can receive location information from the mapping module 228 for each of the media devices 214 in the environment 210 based on a position of the UWB radio 216 associated with a respective media device. The media devices 214 can include any type of audio and/or video media devices that playback digital media, such as any type of audio, video, or audio/video media, as well as any type of digital images.

In this example, the computing device 202 may include stored digital media 254 that is accessible for playback on one or more of the media devices 214 in the environment. For example, the digital media 254 that is accessible for playback from the computing device 202 may be audio digital media, and the media playback manager 232 can initiate to communicate the audio digital media to an audio playback media device in the environment. Similarly, the digital media 254 that is accessible for playback from the computing device 202 may be video digital media, and the media playback manager 232 can initiate to communicate the video digital media to a video playback media device in the environment. Alternatively or in addition, the digital media may be accessible from a network server device for playback on the media device in the environment. The network-based (or cloud-based) digital media can be communicated from a network server device to the media device for the digital media playback of the digital media. In other media playback implementations, a "DIAL" type protocol can be implemented for casting, where a user of the wireless device 102 selects media content for playback on a media device 214 in the environment 210, and the media content is then cast from the wireless device 102, as the digital media 254 from the computing device 202, or from a network server device to the media device 214 for the digital media playback in the environment.

In the environment 210, a user of the computing device 202 may carry the device (e.g., as the wireless device 102) around the environment, such as from room to room in a building. The media playback manager 232 can determine a location of each of the media devices 214 relative to a position of the person in the environment, such as based on a device position of the wireless device 102 that the person carries relative to the location of each of the media devices 214 in the environment. For instance, the media playback manager 232 determines the position of the person as closest to the location of a media device 214 in the environment for digital media playback of the digital media that is cast to the media device, such as the closest location of the wireless device 102 to an audio playback media device or to a video playback media device (e.g., to include an audio/video playback device). In implementations, the mapping module 228 and/or the media playback manager 232 can determine the position of a person and/or the location of a media device 214 in the environment utilizing the UWB ranging data 242, given that UWB time-of-flight (ToF), angle-of-arrival (AoA), and/or time-difference-of-arrival (TDoA) provides a vector of both range and direction.

Additionally, video digital media can be cast or communicated to a media device 214 for video media playback based on which way a smart display or other television device is facing, taking into consideration the orientation of the person in the environment. Utilizing the UWB ranging data and AoA techniques, as well as sensors on the wireless device 102 and/or a captured image from the camera device 244 for example, the media playback manager 232 can determine the direction that a user's phone is facing, and the most likely media device 214 to cast or communicate the digital media for media playback. The media playback manager 232 can receive orientation information that indicates an orientation of the person in the environment, and initiate the communication of the digital media to the media device 214 that corresponds to the orientation of the person for viewing the digital media.

In implementations, the UWB radios 216, 218 in the environment 210, and the UWB ranging data 242, can provide the relative orientation between the UWB radios, as well as with additional sensors that indicate an orientation of the user who carries the wireless device 102 in the environment. For example, if the user carries the wireless device 102 in hand and is viewing the display screen of the device, then it is likely the UWB components of the device are facing the same or similar direction as the user, given the UWB antennas for AoA are positioned opposite the display in the device. Alternatively, if the wireless device 102 is carried in a pocket of the user, the display of the device likely faces outward and the device UWB components indicate that the user is facing in an opposite direction. The UWB antenna array in the wireless device 102, which is carried by a user, can be used as an indication of the orientation of the person in the environment, such as based on whether the user is facing normal to the device (0 degree angle), sideways to the device (90 degree angle), or facing away from the device (180 degree angle).

Other sensors of the device can also indicate a particular orientation of the wireless device 102 to the user, such as in a pocket and the device display is facing the body of the user, which would indicate that the UWB antenna array is pointed in the direction the user is moving. Alternatively, the device display may be facing outwards away from the body of the user, which would indicate that the UWB antenna array is pointed in an opposite direction to the vector of travel of the user. In other implementations utilizing sensors of the wireless device 102, the user orientation in the environment 210 may be determinable by the media playback manager 232 based on user face detection, eye gaze detection with a camera of the device, and/or with other types of sensors that sense proximity of the user. The media playback manager 232 can then initiate to cast or communicate the video digital media to a media device 214 for video media playback based on the user orientation and/or where the user is looking.

Alternatively or in addition, the camera device 244 can be used to capture an image 246 of the environment, and the object detection module 248 utilized to determine the orientation of the user in the environment from the captured image. The media playback manager 232 can receive the orientation information from the camera device 244 and/or from the object detection module 248. The media playback manager 232 can also respond to detected user gesture motions, such as captured by the camera device 244 and/or by other cameras in the environment 210, to initiate digital media playback of the digital media on a particular media device 214.

In implementations, the mapping module 228 and/or the media playback manager 232 can also determine the position of a person within a room of a building (e.g., the environment) that includes the location of the media device 214 for digital media playback of the digital media. Additionally, as the person moves the wireless device 102 (e.g., computing device 202) within the building environment, such as from room to room, the media playback manager 232 can determine a subsequent position of the wireless device within a different room of the building, and transfer the casting or communication of the digital media to a different media device 214 in the different room for the digital media playback of the digital media, based on the determined subsequent position of the person in the environment relative to the location of the different media device.

The media playback manager 232 can also maintain a priority casting list of selected media devices 214, and digital content, such as the digital media 254 (e.g., audio, video, and/or audio/video) stored on the computing device 202, can be queued for playback at the selected media devices 214 based on user location and/or orientation in the environment, the device position 164 in the environment, the time of day, any other type of determined scenario, and/or based on determined user intent. These aspects can also include multi-device playlist management, such as for crowdsourced content with multiple mobile devices in proximity to audio playback speakers in an environment or environment region. In implementations, the media playback manager 232 can auto-select the different media devices 214 based on the priority casting list 166 of ordered and selected media devices in the environment.

The motion controller 234 is implemented by the computing device 202 for aspects of object contextual control based on the UWB radios in the environment. The camera devices 244 in the environment 210, such as a security camera, indoor environment camera, a doorbell camera, a mobile device camera, a camera integrated with a computing device or a media device, and the like, can capture motions in the environment. Alternatively or in addition, the mobile wireless device 102 may be moved by a user in the environment, like a wand device, to generate motions detected by sensors of the mobile wireless device. The motions of the wireless device 102 may also be captured by the camera devices 244 in the environment. The motion controller 234 can then determine, from a captured motion and/or from a motion detected by device sensors, a motion indication to interact with a device or object in the environment.

The interaction with a device or object in the environment 210, as indicated by a detected motion, can be based on a location of the device or object as determined by a position of the UWB radio associated with the device or object. The motion controller 234 can receive location information from the mapping module 228 for each of the media devices 214, other devices 220, and/or objects 222 in the environment 210 based on a position of the UWB radio 216 associated with a respective media device, and for each of the other devices 220 and objects 222 based on a position of the UWB radio 218 of a UWB tag 212 that is associated with a respective device or object. Based on a motion indication, as determined by the motion controller 234 from a detected motion, the motion controller 234 can then initiate a control communication to the device or object to interact with the device or object.

The motion controller 234 can interact with a device or object in the environment based on a motion that is determined as a motion indication to toggle a device state of the device or object, such as to turn the device or object on or off. For example, a detected flip motion directed at a lamp (e.g., an object in the environment) may be determined as a first motion indication to turn the lamp on, and a subsequent rotation motion directed at the lamp may be determined as a second motion indication to adjust a brightness of the lamp. The motion controller 234 can determine a type of a motion indication and correlate the type of the motion indication with a particular device control of the device. For example, a motion indication may be determined from a swipe motion, a rotation motion, a twist motion, a flip motion, or any other type of gesture motion. The motion controller 234 can then correlate the type of the motion indication to control a media device 214, another type of device 220, or an object 222, such as to turn a device off, turn the device on, mute the device, change a channel, increase volume, decrease volume, or any other type of device control.

In an implementation, the motion controller 234 can determine, from a captured motion and/or from a motion detected by device sensors, a motion indication to cast the digital media 254 to a media device 214 for digital media playback, and initiate communication of the digital media to the device for the digital media playback of the digital media. The media devices 214 can include any type of audio and/or video media devices that playback digital media, such as any type of audio, video, or audio/video media, as well as any type of digital images. In this example, the computing device 202 may include the stored digital media 254 that is accessible for playback on one or more of the media devices 214 in the environment. Alternatively or in addition, the digital media may be accessible from a network server device for playback on media device 214 in the environment 210, as described above.

In another implementation, the motion controller 234 can determine a motion indication to transfer digital media playback from one device to another device in the environment, and initiate communication of digital media to the other device for digital media playback at the other device. For example, the motion controller 234 can initiate to cast digital media to media devices, following the movements and/or orientation of a user, such as when the user walks through a home environment, a business, a tradeshow, a retail store, or any other type of environment. In the environment 210, a user of the computing device 202 may carry the device (e.g., as the wireless device 102) around the environment, such as from room to room in a building.

The motion controller 234 can determine a location of each of the media devices 214 relative to a position of the person in the environment, such as based on a device position of the wireless device 102 that the person carries relative to the location of each of the media devices 214 in the environment. For instance, the motion controller 234 determines the position of the person as closest to the location of a media device 214 in the environment for digital media playback of the digital media that is cast to the media device. In implementations, the mapping module 228, the tracking service 236, and/or the motion controller 234 can determine the position of a person and/or the location of a media device 214 in the environment utilizing the UWB ranging data, given that UWB time-of-flight (ToF), angle-of-arrival (AoA), and/or time-difference-of-arrival (TDoA) provides a vector of both range and direction.

Additionally, video digital media can be cast or communicated to a media device 214 for video media playback based on which way a smart display or other television device is facing, taking into consideration the orientation of the person in the environment. Utilizing the UWB ranging data and AoA techniques, as well as the sensors of the wireless device 102, the detected motions, and/or a captured image from the camera device 150 for example, the motion controller 234 can determine the direction that a user's phone is facing, and the most likely media device 214 to cast or communicate the digital media for media playback. The motion controller 234 can receive orientation information that indicates an orientation of the person in the environment, and initiate the communication of the digital media to the media device 214 that corresponds to the orientation of the person for viewing the digital media. In implementations, the UWB radios 216, 218 in the environment 210, and the UWB ranging data 242, can provide the relative orientation between the UWB radios, as well as with additional sensors that indicate an orientation of the user who carries the wireless device 102 in the environment.

In aspects of described techniques, the automation controller 230 is implemented by the computing device 202 to coordinate experiences in the environment, which includes the multiple UWB radios 216, 218 and/or UWB-enabled devices. The automation controller 230 can coordinate the networked and/or UWB-enabled devices for automation experiences in the environment, where the devices may include the media devices 214, smart devices, other UWB-enabled devices, the UWB tags 212, sensors (e.g., the camera device sensors 250, wireless device sensors), camera devices 244, and any other computing, electronic, and/or mobile devices 204. The automation controller 230 can aggregate sensor data, device data, and the UWB ranging data 242 (e.g., ToF and AoA data) to determine an environment experience. Generally, the automation controller is a logical controller, which can be implemented by the wireless device 102, by one of the other smart devices in the environment, a smart home hub, and/or as a cloud-based controller for data aggregation and processing.

In implementations, the automation controller 230 can monitor streaming media, screen sharing, and devices entering or exiting the environment 210, as well as any other type of device interactions and movement in the environment. For example, the automation controller 230 can receive the UWB ranging data 242 from the UWB radios 216, 218 in the environment, and monitor locations of the respective devices in the environment based on the UWB ranging data received from the UWB radios. The automation controller 230 can periodically monitor the UWB ranging data (e.g., ToF and AoA data) and determine whether a device and/or a user of the device is moving in the environment, and in which direction. Based on detected locations, motions, device interactions, and/or user and device orientations, the automation controller 230 can initiate, update, interact with, and/or control any type of home automation device, IoT device, and/or home automation system in the environment. For example, the automation controller 230 can monitor user and/or wireless device movements in the environment, and correspondingly, modify HVAC settings, turn-on and turn-off lights and devices, update a media experience, and/or any other type of environment automation experience.

The automation controller 230 can also monitor the various interactions with the respective devices in the environment, such as wireless communications on the wireless device 102, and streaming digital media to a media device 214 in the environment. For example, the automation controller 230 can detect or determine that a user is using the wireless device 102, such as for a VoIP call, and is moving within the environment 210. The automation controller 230 can then initiate devices in the environment to maintain the wireless connection to the wireless device as the user moves throughout the environment. Similarly, the automation controller 230 can manage digital media playback, such as music or streaming content, to follow a user throughout the environment, transferring from one device to another for content playback as the location, orientation, and/or direction of the user changes in the environment. In the event that a media playback device is not available at a particular location or region within the environment 210, or if the user takes the mobile device out of the environment, the automation controller 230 can initiate to pause the digital media playback.

The automation controller 230 may also receive sensor data from one or more of the devices in the environment, and correlate the sensor data with the UWB ranging data 242 to monitor the locations of the respective devices in the environment. In implementations, the sensor data can include a captured image 246 of the environment, as captured with a camera device 244, orientation data that indicates an orientation of a mobile device (e.g., the wireless device 102) in the environment, and/or motion data. Similarly, the automation controller may also receive global positioning system (GPS) data from one or more of the devices in the environment, and correlate the GPS data with the UWB ranging data 242 to monitor the locations of the respective devices in the environment.

In implementations, the automation controller 230 can receive location information from the mapping module 228 for each of the media devices 214, the other devices 220, and objects 222 in the environment 210 based on a position of the UWB radio 216 associated with a respective media device, and for each of the other devices 220 and objects 222 based on a position of the UWB radio 218 of a UWB tag 212 that is associated with a respective device or object. The automation controller 230 can also determine a device location change of a device in the environment 210, such as based on the UWB ranging data 242 and/or other sensor data, and then update an automation experience in the environment based on a monitored interaction and/or the location change of the device in the environment. The automation controller 230 can track the movements and/or orientation of a user (e.g., the wireless device 102), such as when the user walks through or around in the environment, such as from room to room in a building.

In implementations, the automation controller 230 can update an automation experience in the environment 210 based on any type of the sensor data that is received from the various devices, such as based on a captured image 246 of the environment, based on the orientation of the wireless device 102 in the environment, and/or based on motion data corresponding to detected motions in the environment. For example, the camera devices 244 in the environment 210, such as a security camera, indoor environment camera, a doorbell camera, a mobile device camera, a camera integrated with a computing device or a media device, and the like, can capture motions in the environment. Alternatively or in addition, a mobile wireless device 102 may be moved by a user in the environment, like a wand device, to generate motions detected by sensors of the mobile wireless device. The motions of the mobile wireless device 102 may also be captured by the camera devices 244 in the environment.

The automation controller 230 as implemented by the computing device 202 (e.g., the wireless device 102) can also determine coverage dead zones in the environment, such as to determine where voice-over-IP (VoIP) or cellular calls are dropped. The automation controller 230 can also determine a coverage dead zone where digital media, such as audio and/or video streaming media, does not playback on a media device 214 in the environment. The automation controller 230 can also determine locations in the environment 210 where motions (e.g., gestures) are not detectable in the environment due to lack of camera device coverage. In implementations, the automation controller 230 can determine or assess coverage dead zones 164 in the environment based on limited or no signal strength (e.g., received signal strength indicator (RSSI) measurements) and/or based on quality of service (QoS) metrics.

In aspects of the described techniques, the automation controller 230 can receive the UWB ranging data 242 from the UWB radios 216, 218 in the environment 210, and monitor locations of the respective devices in the environment. The automation controller 230 can also detect a loss of coverage by a device connected in the environment, and determine a coverage dead zone 164 within the environment at the location of the loss of coverage by the device based on the UWB ranging data. The loss of coverage by the device in the environment may be a voice-over-IP (VOIP) or cellular call dropped by the device. Alternatively, the loss of coverage may be detected by the automation controller as an interruption of streaming digital media to a media device 214. Further, the loss of coverage may include non-detectable motions in the environment due to a lack of camera coverage.

In implementations, the automation controller 230 can determine a coverage dead zone based on a time-difference-of-arrival (TDoA) between the wireless device 102 and an access point (e.g., a router) in the environment, and the angle-of-arrival (AoA) to the access point. The automation controller 230 can also map the coverage dead zone based on received signal strength indicator (RSSI) measurements and quality of service (QoS) metrics from the location of the loss of coverage by the device. This includes accounting for dropped coverage, such as when a voice-over-IP (VOIP) or cellular call is dropped by the device, or is likely to be dropped by the device in the coverage dead zone. As noted below, the device can be triggered to switch from VoIP to cellular (or vice-versa) to maintain a wireless communication connection in or around a detected coverage dead zone.

In aspects of the described techniques, the device in the environment 210 that loses coverage may be the wireless device 102, such as carried in the environment by a user of the device, and the automation controller 230 can determine the coverage dead zone based on an orientation of the wireless device at the location of the loss of coverage. Further, the automation controller 230 can detect that the wireless device is wirelessly connected for communication in the environment and moving in a direction toward a coverage dead zone, and initiate the wireless device switching from VoIP to cellular to maintain the communication in the coverage dead zone.

Figure 3:
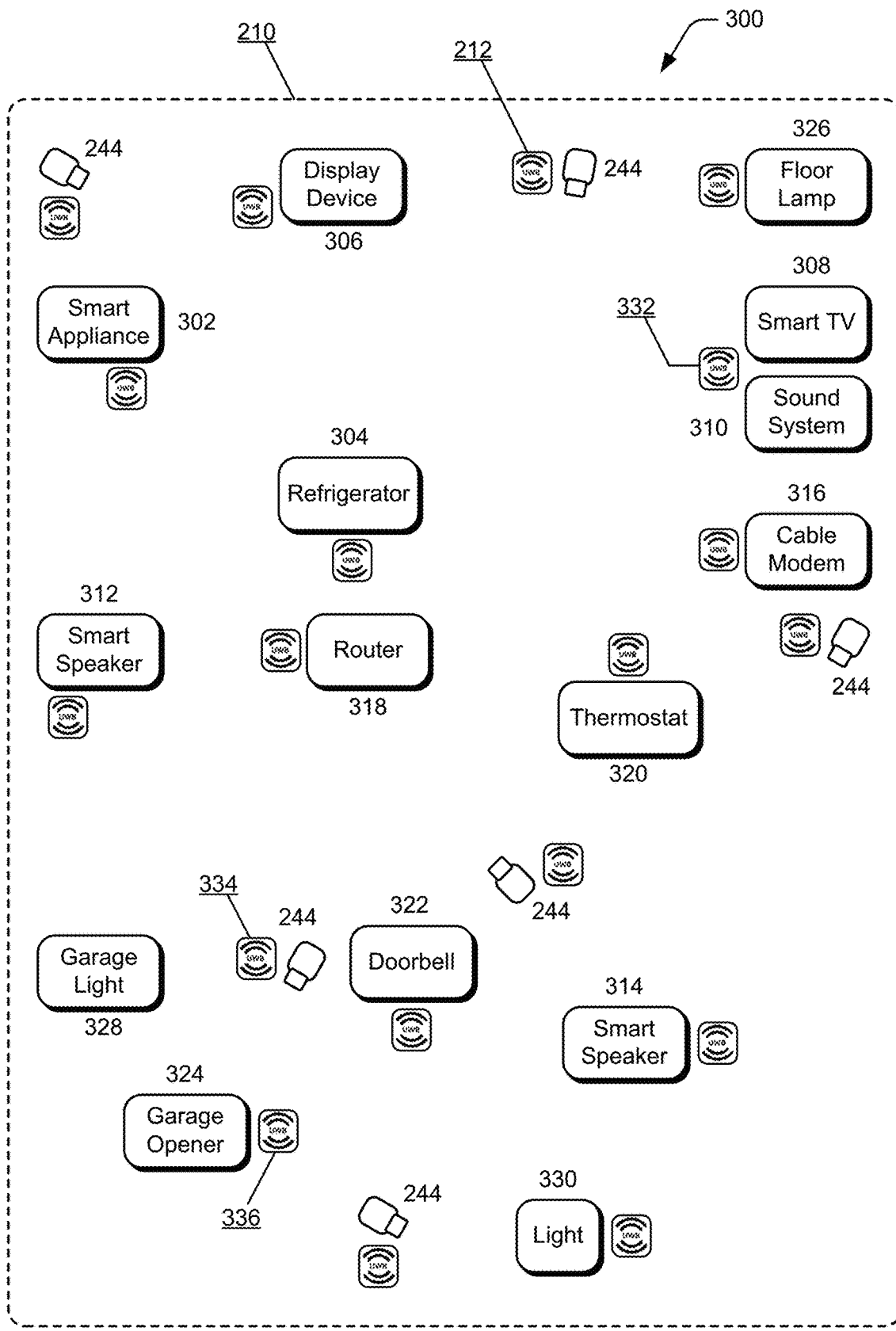
FIGS. 3-5 illustrate examples of environment mapping generated in accordance with one or more implementations as described herein.

FIG. 3 illustrates an example 300 of the environment mapping 252 showing the location of various media devices, objects, and/or other devices in the environment 210, such as a location association map generated by the mapping module 228 implemented by the computing device 202, as shown and described with reference to FIG. 2. In this example 300 of the environment 210, the position of each of the devices and other objects is shown relative to each other in the environment, as determined based on the precise location positioning capabilities of UWB utilizing the UWB tags 212. The environment includes examples of the devices 220, such as a smart appliance 302 and refrigerator 304, a cable modem 316 and router 318, a thermostat 320 and smart doorbell 322, and a garage door opener 324. The environment 210 also includes examples of the media devices 214, such as a display device 306, a smart TV 308 and sound system 310, and smart speakers 312, 314. The environment 210 also includes examples of other objects 222, such as a floor lamp 326, a garage light 328, and an outdoor light 330. The environment 210 also includes several examples of camera devices 244 positioned at various locations throughout the environment.

In this example 300 of environment mapping, the relative locations of the media devices, objects, and other devices to each other are shown in the environment, without walls of the building, such as in a home environment. In an aspect of the environment mapping, it should be noted that one UWB tag can be associated with more than one object and/or device in the environment, and can be labeled accordingly to provide the user a meaningful identifier that represents the combined objects and/or devices. For example, the UWB tag 332 is positioned for association with both the smart TV 308 and the sound system 310, and the UWB tag may be identified as "entertainment center." Further, although the illustrated examples may generally indicate an overall one-to-one correspondence between the UWB tags 212 and devices in the environment 210, there is no such requirement for implementation of the various techniques described in. For example, a room, region, or floor of the environment (e.g., a home or business environment) may have several fewer UWB tags than devices. In implementations, a small number of the UWB tags 212 (e.g., three or four per region or floor of the environment) may sufficiently cover the area.

In another aspect of the environment mapping, two or more of the UWB tags can be used to associate and locate objects that are not tagged in their spatial location. For example, the garage light 328 does not have an associated UWB tag. However, the two UWB tags 334, 336 (e.g., in the garage) can be used to determine the relative position of the garage light 328 in the environment for spatial awareness. The associated camera device 244 may also be used to capture an environment image 246 of the region (e.g., in the garage), and the environment image is used to further determine the relative position of the garage light 328 in the environment for spatial awareness.

Figure 4:
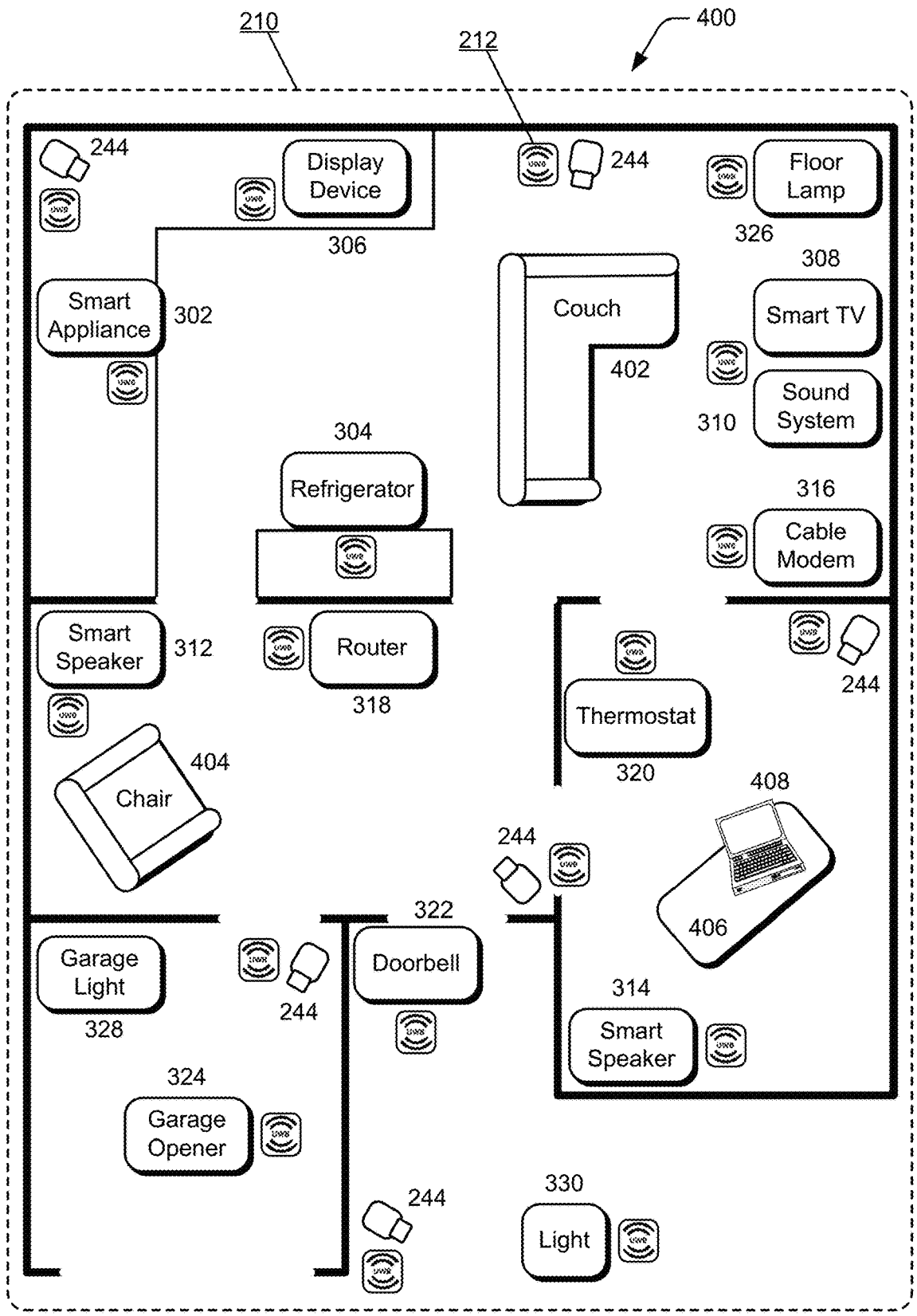

FIG. 4 similarly illustrates an example 400 of the environment mapping 252 showing the location of the media devices, objects, and/or other devices in the environment, such as generated by the mapping module 228 implemented by the computing device 202, as shown and described above with reference to FIGS. 1 and 2. Further, in this example 400 of a building environment, such as in a smart home implementation, the mapping module 228 generates the environment mapping of the media devices 214, other devices 220, and/or the objects 222 in the environment 210 based on the identified objects and/or the devices in the environment, as determined by the object detection module 248 from captured environment images 246. The various camera devices 244 positioned at locations throughout the environment 210 can be used to capture the environment images 246 of the different regions of the environment.

The mapping module 228 generates the environment mapping 252 as a floor plan of the building, including the locations of the objects 222, media devices 214, and/or other devices 220 in the building, with the floor plan including positions of walls of the building as determined from the captured environment images. The environment mapping shows the position of each of the devices and objects relative to each other, as well as the walls of the environment, which provides a more detailed spatial context. In addition to the media devices 214, objects 222, and other devices 220 shown in the environment mapping in FIG. 3, this example 400 also includes other objects determined from the captured environment images 246. For example, the mapped environment also includes the location and position of a couch 402, a chair 404, and a desk 406 in various rooms of the home environment.

Additionally, a UWB-enabled laptop computing device 408 has been added into the environment, and the laptop computing device communicates via a UWB radio with the UWB tags 212 and other UWB-enabled devices in the environment. The laptop computing device 408 can be implemented as an example of the computing device 202, which is shown and described with reference to FIG. 2. Notably, the laptop computing device 408 can implement the mapping module 228 to facilitate mapping the objects and/or devices in the environment 210, based on the locations and relative positions of each of the UWB tags and UWB radios. The wireless UWB communications for mapping objects and/or devices in the environment 210 are similar between the UWB tags and/or UWB-enabled devices in the environment.

Figure 5:
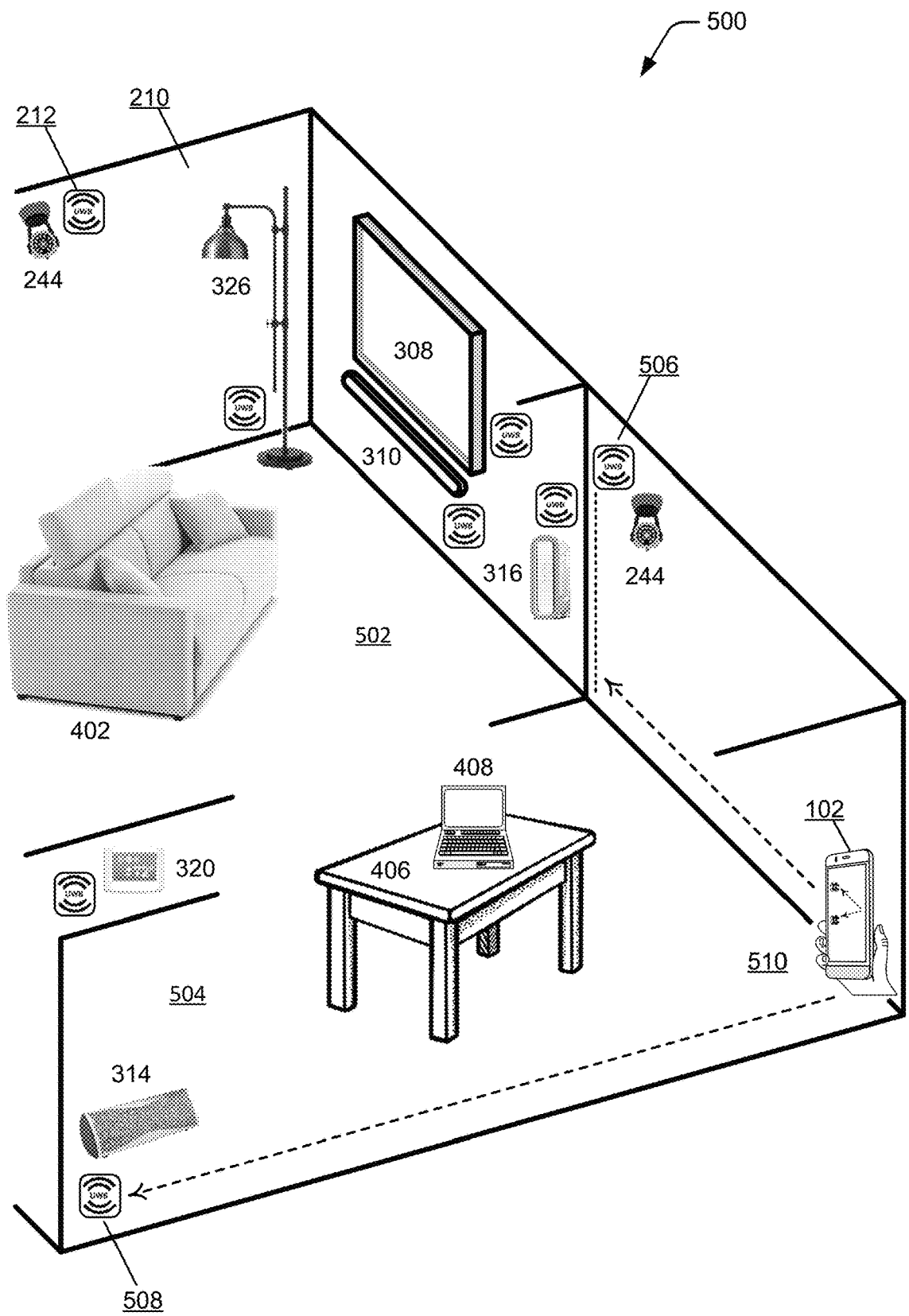

FIG. 5 illustrates an example 500 of the environment mapping 252 as an environment depth map, as described herein. The single-elevation floorplan in the examples of environment mapping shown in FIGS. 3 and 4 may also be generated by the mapping module 228 as a multi-elevation building or home environment. Notably, the system of UWB tags 212 and UWB radios 216, 218 also provides for z-elevation differentiation using the precise location positioning capabilities of UWB for a three-dimension coordinate mapping of a multi-elevation environment. In this example 500, a portion of the environment mapping 252 shown in FIG. 4 is recreated and shown as the environment depth map.

The portion of the environment 210 shown in the environment depth map shows the relative locations of the media devices 214, objects 222, and other devices 220 to each other in various rooms of the home environment. For example, a living area 502 includes a camera device 244, the smart TV 308 and sound system 310, the cable modem 316, the floor lamp 326, and the respective UWB tags 212 and/or UWB radios that are associated with the devices and objects. Similarly, an office area 504 includes a camera device 244, the smart speaker 314, the desk 406, the laptop computing device 408, and the respective UWB tags 212 and/or UWB radios that are associated with the objects and devices.

This example 500 of the environment depth map also illustrates environment dimensioning utilizing existing UWB tags 212 and/or placing additional UWB tags in the environment 210. For example, dimensions of the office area 504 can be measured using the precision accuracy of UWB based on the UWB tags 506, 508 in two corners of the room, along with the wireless device 102 communicating with the UWB radios 218 of the UWB tags from another corner of the room at 510 to determine the length and width of the room. Additionally, by utilizing more of the UWB tags 212 in the environment 210 and/or by altering the placement of the wireless device 102, the area and volume of regions in the environment can be determined, as well as measurements and dimensions of objects in the environment. Taken in conjunction with environment images 246 captured by one or more of the camera devices 244, surface areas of walls and floors can be determined, such as for determining the square footage for flooring and painting projects, as well as for virtual modeling and/or remodeling applications by placing objects in a viewfinder of the wireless device 102 to assess their appearance in the environment.

Additionally, AR overlays and enhancements can be generated for an AR-enhanced depth map as a virtual model of the environment, which can be displayed in an enhanced user interface on the display screen of the wireless device 102. The object and environment dimensioning and measurements of objects 222 can be used to provide calibration inputs to the AR-enhanced depth map.

Figure 6:
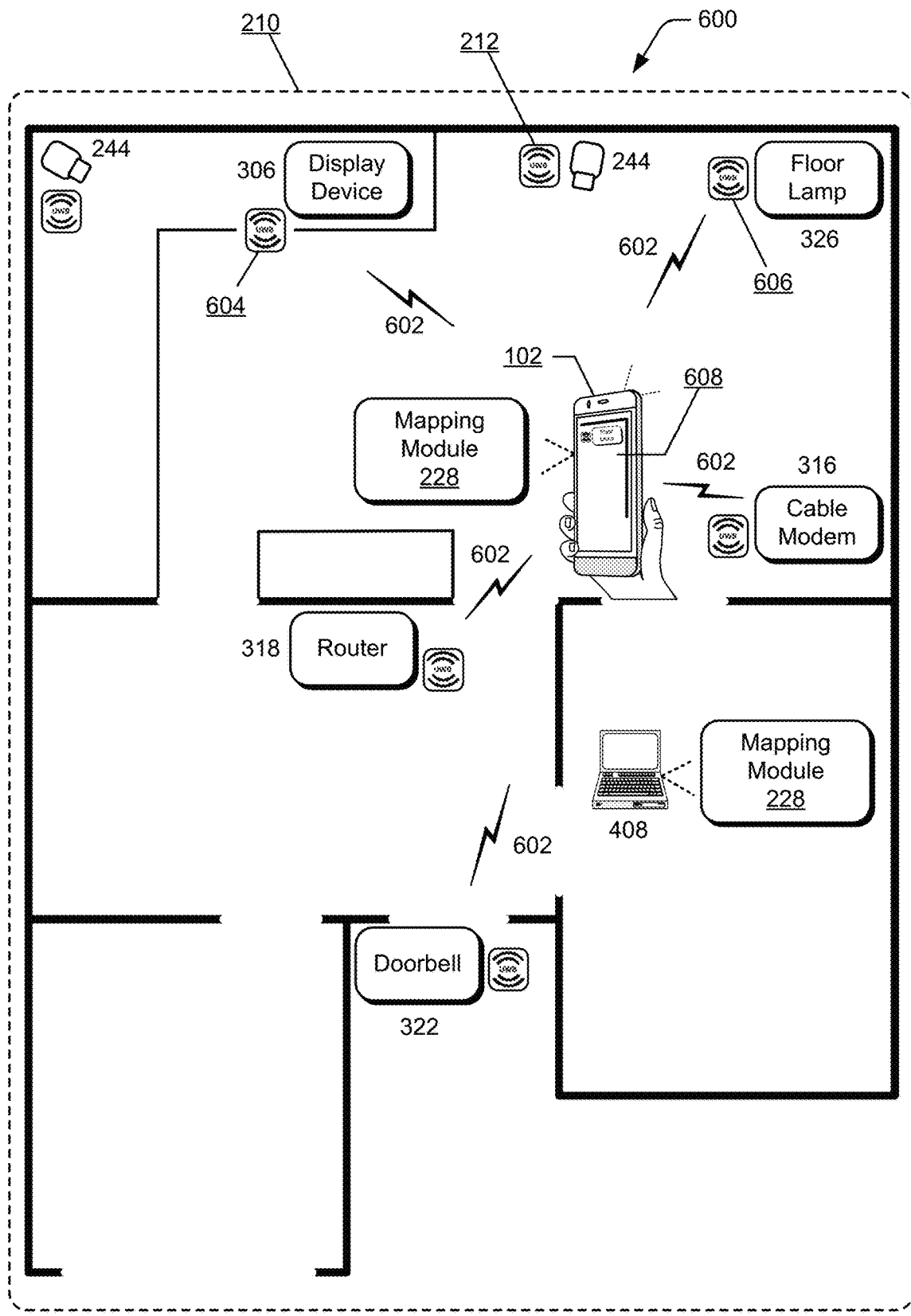
FIG. 6 illustrates examples of UWB tags and devices location association in accordance with one or more implementations described herein.

FIG. 6 illustrates examples 600 of UWB tags and devices location association, as described herein. A portion of the example of the environment 210 shown in FIG. 4 is further illustrated with additional example features of the mapping module 228, as implemented in a computing device 202, such as the wireless device 102 (e.g., a mobile phone or other device) in the environment. In these examples 600, the wireless device 102 communicates via the UWB radio 120 of the UWB accessory 118 with the UWB tags 212 and UWB radios 216, 218 in the environment. Similarly, the wireless device 102 can also communicate via a Bluetooth radio and/or a Wi-Fi radio with the media devices 214 and/or the other devices 220 in the environment, such as the display device 306, the cable modem 316, the router 318, the smart doorbell 322, and the laptop computing device 408, to name a few. Although these examples 600 are described with reference to the wireless device 102 implementing the mapping module 228, it should be noted that the laptop computing device 408 may also implement the mapping module 228, and operate independently or in conjunction with the instantiation of the mapping module as implemented by the wireless device.

In an example use case, a user can start the mapping module 228 as an application on the wireless device 102 (e.g., a mobile phone), as well as place the UWB tags 212 for association with any of the media devices 214, objects 222, and/or other devices 220 in the environment. An operational mode of the UWB tags 212 can be enabled, as well as an advertising mode, discoverable mode, or other type of operational mode initiated on the other devices 220 and/or media devices 214. The UWB tags 212, as well as the wireless device 102, can then scan for the Bluetooth or BLE advertising and/or other identifiable RF packets advertised as messages from the devices. The mapping module 228 can initiate to query the UWB tags 212 for a BLE MAC ADDR report, device name, RSSIs, and any other type of device identifying information.

Additionally, the UWB tags 212 can generate an ordered list of proximate devices 220 and/or media devices 214 based on RSSI and/or reported transmission power to assess which of the devices is the closest to a particular UWB tag. The mapping module 228 implemented by the wireless device 102 can also compare the UWB tag reports against its own database of device identifying information 238 and UWB tag identifiers. Additionally, the mapping module 228 can then compare the signal path loss of the signals received from the UWB tags and other UWB-enabled devices to determine which of the UWB tags and devices are proximate each other based on similar signal path loss. Notably, a user can override any of the UWB tag and device determined associations, either by a UWB tag itself or by the mapping module, and the user can then designate which one of the UWB tags 212 is associated with a particular device or object.

In implementations, some reported BLE MAC ADDRs may be random addresses due to the BLE privacy feature, and are unresolvable by a UWB tag 212 without an identity resolving key that is otherwise available on the wireless device 102, given that the wireless device has been previously paired with the devices using random addressing. For these obscure BLE MAC ADDRs due to random addresses, or unpaired devices not transmitting identifiable information, the wireless device 102 can disambiguate, communicate the appropriate address to the UWB tag 212, and update the database for the UWB tag identifiers. A UWB tag identifier can be generated automatically by the mapping module 228, or optionally, a user of the device may be prompted via the user interface to approve or change the generated UWB tag identifiers and designated associations with objects and/or smart devices. For further disambiguation of the UWB tags 212 associated with the media devices 214, objects 222, and/or other devices 220 in the environment 210, a camera device 244 can be used to capture an environment image 246. The object detection module 248 can then determine the location of the devices and/or objects in the environment, and the location information is used by the mapping module 228 to generate the environment mapping.

The mapping module 228 receives (via wireless device 102) the Bluetooth or BLE advertised communications 602 from the UWB tags 212 and other UWB radios of devices in the environment 210. The mapping module 228 can then correlate a UWB tag 212 with a nearby device based on RSSI measurements of the Bluetooth or BLE advertised communications 602 from the UWB tags and UWB radios of the devices. For example, the wireless device 102 can receive advertised signals from a UWB tag 604 and the smart display device 306, and the mapping module 228 compares the signal path loss from the received signals to determine that the UWB tag 604 and the smart display device 306 are proximate each other based on similar signal path loss. The mapping module 228 can then associate the UWB tag 604 with the nearby smart display device 306, and communicate the association back to the UWB tag 604, such as via in-band UWB communications.

In a similar implementation, the mapping module 228 receives (via wireless device 102) the Bluetooth or BLE advertised communications 602 from a UWB tag 606 that is proximate an object, such as the floor lamp 326 in the environment 210. The mapping module 228 can utilize the received signals and a captured environment image 246 to determine that the UWB tag 606 is proximate the floor lamp 326, associate the UWB tag 606 with the nearby object, and communicate the association back to the UWB tag 606, such as via in-band UWB communications. As noted above, a user of the wireless device 102 can override any of the UWB tag and device determined associations by the mapping module, and the user can designate any one of the UWB tags as being associated with a particular device or other object.

Example method 700 is described with reference to FIG. 7 in accordance with implementations for UWB accessory for a wireless device. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 7:
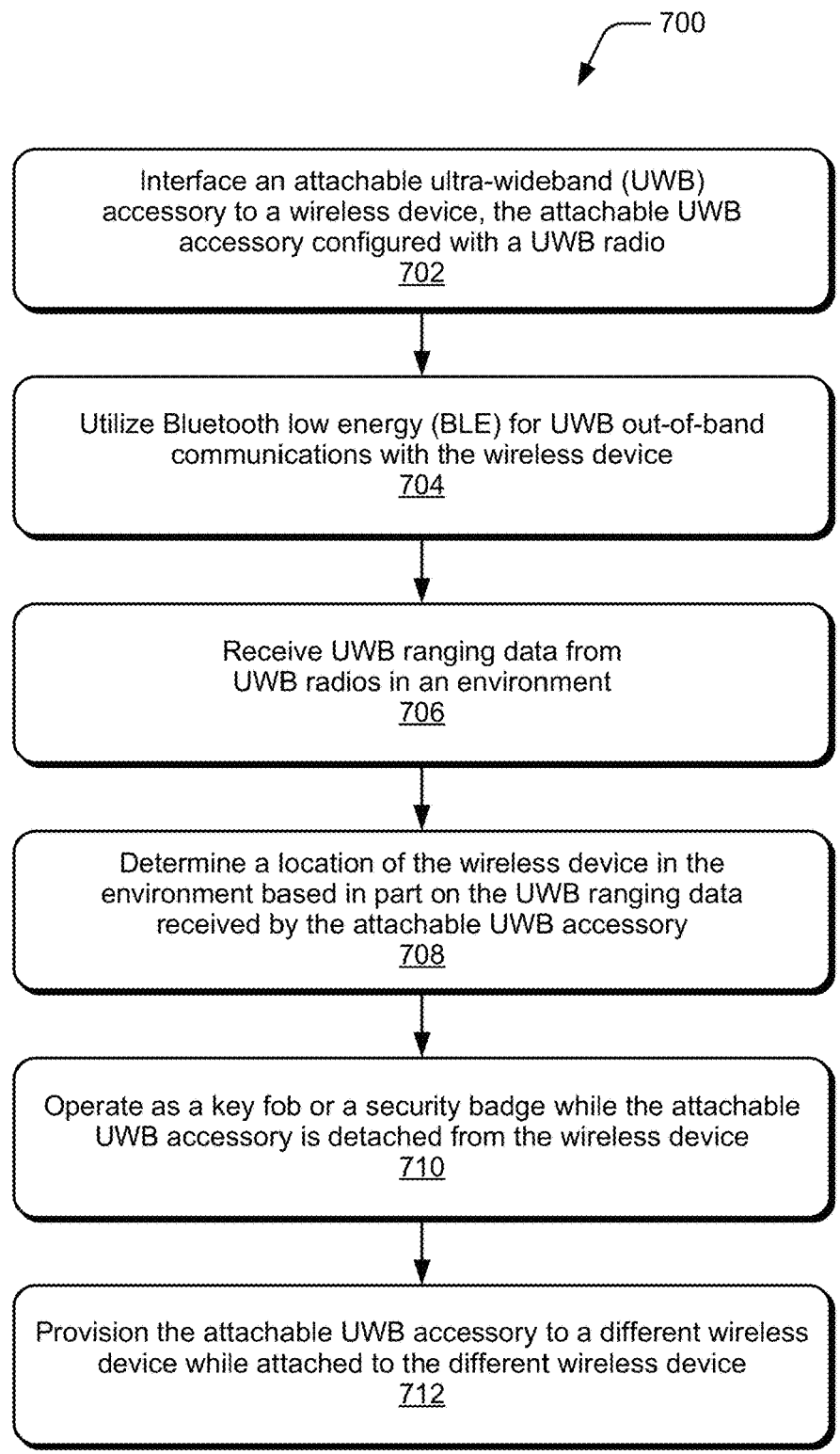
FIG. 7 illustrates an example method for a UWB accessory for a wireless device in accordance with one or more implementations of the techniques described herein.

FIG. 7 illustrates example method(s) 700 for a UWB accessory for a wireless device. The order in which the method is described is not intended to be construed as a limitation, and any number or combination of the described method operations can be performed in any order to perform a method, or an alternate method.

At 702, an attachable ultra-wideband (UWB) accessory is interfaced to a wireless device, the attachable UWB accessory configured with a UWB radio. For example, the UWB accessory 118 can be attached to the wireless device 102, enabling the wireless device for UWB communications with the UWB radio 216 of the attachable UWB accessory.

At 704, Bluetooth low energy (BLE) is utilized for UWB out-of-band communications with the wireless device. For example, the UWB accessory 118 expands the wireless device 102 capabilities and facilitates communication of UWB ranging data (e.g., ToF and AoA data). The UWB accessory 118 can also interface and/or communicate with the wireless device 102 using BLE for in-band communication 126. Given that BLE is implemented in most all smartphones (e.g., the BLE transceiver 112), BLE is readily available to interface between a mobile wireless device and the UWB accessory 118. The UWB protocol is designed to utilize out-of-band communications that are generally low-power, wireless protocols for UWB device discovery and UWB session configuration, such as via Bluetooth or BLE, which uses less power than a UWB radio used alone.

At 706, UWB ranging data is received from UWB radios in an environment, and at 708, a location of the wireless device in the environment is determined based in part on the UWB ranging data received by the attachable UWB accessory. For example, the micro-controller (MCU) 132 of the UWB accessory 118 can receive UWB ranging data from the other UWB radios in the environment and determine a corresponding location of the wireless device 102 in the environment.

At 710, the attachable UWB accessory operates as a key fob or a security badge while the attachable UWB accessory is detached from the wireless device. For example, the UWB accessory 118 is also detachable from the wireless device 102 and can be operable as a key fob or security badge while detached from the wireless device.

At 712, the attachable UWB accessory is provisioned to a different wireless device while attached to the different wireless device. For example, the UWB accessory 118 can be configured for attachment to a different wireless device, and the attachable UWB accessory is provisioned and associated with a user of the different wireless device while the accessory is attached to the different wireless device.

Figure 8:
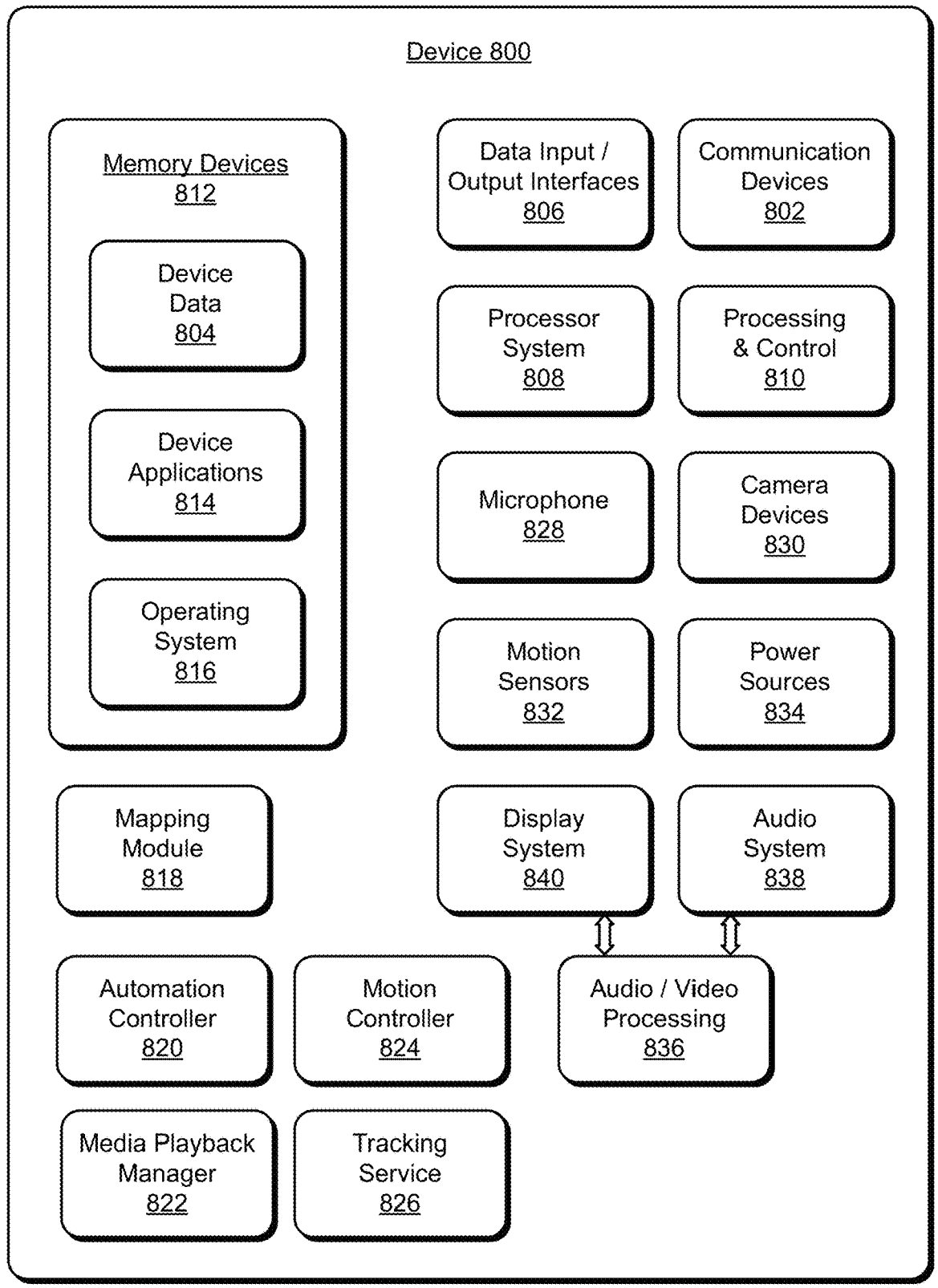
FIG. 8 illustrates various components of an example device that can be used to implement the techniques for a UWB accessory for a wireless device as described herein.

FIG. 8 illustrates various components of an example device 800, which can implement aspects of the techniques and features for UWB accessory for a wireless device, as described herein. The example device 800 can be implemented as any of the devices described with reference to the previous FIGS. 1-7, such as any type of a wireless device, mobile device, mobile phone, flip phone, client device, companion device, paired device, display device, tablet, computing, communication, entertainment, gaming, media playback, and/or any other type of computing and/or electronic device. For example, the wireless device 102, the computing device 202, the camera device 244, and/or a UWB tag 212 described with reference to FIGS. 1-7 may be implemented as the example device 800.

The example device 800 can include various, different communication devices 802 that enable wired and/or wireless communication of device data 804 with other devices. The device data 804 can include any of the various devices data and content that is generated, processed, determined, received, stored, and/or communicated from one computing device to another. Generally, the device data 804 can include any form of audio, video, image, graphics, and/or electronic data that is generated by applications executing on a device. The communication devices 802 can also include transceivers for cellular phone communication and/or for any type of network data communication.

The example device 800 can also include various, different types of data input/output (I/O) interfaces 806, such as data network interfaces that provide connection and/or communication links between the devices, data networks, and other devices. The I/O interfaces 806 can be used to couple the device to any type of components, peripherals, and/or accessory devices, such as a computer input device that may be integrated with the example device 800. The I/O interfaces 806 may also include data input ports via which any type of data, information, media content, communications, messages, and/or inputs can be received, such as user inputs to the device, as well as any type of audio, video, image, graphics, and/or electronic data received from any content and/or data source.

The example device 800 includes a processor system 808 of one or more processors (e.g., any of microprocessors, controllers, and the like) and/or a processor and memory system implemented as a system-on-chip (SoC) that processes computer-executable instructions. The processor system 808 may be implemented at least partially in computer hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that may be implemented in connection with processing and control circuits, which are generally identified at 810. The example device 800 may also include any type of a system bus or other data and command transfer system that couples the various components within the device. A system bus can include any one or combination of different bus structures and architectures, as well as control and data lines.

The example device 800 also includes memory and/or memory devices 812 (e.g., computer-readable storage memory) that enable data storage, such as data storage devices implemented in hardware which can be accessed by a computing device, and that provide persistent storage of data and executable instructions (e.g., software applications, programs, functions, and the like). Examples of the memory devices 812 include volatile memory and non-volatile memory, fixed and removable media devices, and any suitable memory device or electronic data storage that maintains data for computing device access. The memory devices 812 can include various implementations of random-access memory (RAM), read-only memory (ROM), flash memory, and other types of storage media in various memory device configurations. The example device 800 may also include a mass storage media device.

The memory devices 812 (e.g., as computer-readable storage memory) provide data storage mechanisms, such as to store the device data 804, other types of information and/or electronic data, and various device applications 814 (e.g., software applications and/or modules). For example, an operating system 816 can be maintained as software instructions with a memory device 812 and executed by the processor system 808 as a software application. The device applications 814 may also include a device manager, such as any form of a control application, software application, signal-processing and control module, code that is specific to a particular device, a hardware abstraction layer for a particular device, and so on.

In this example, the device 800 includes a mapping module 818, as well as an automation controller 820, a media playback manager 822, a motion controller 824, and a tracking service 826 that implement various aspects of the described features and techniques described herein. The mapping module 818, automation controller 820, media playback manager 822, motion controller 824, and tracking service 826 can each be implemented with hardware components and/or in software as one of the device applications 814, such as when the example device 800 is implemented as the wireless device 102, computing device 202, and/or the camera device 244 described with reference to FIGS. 1-7. An example of the mapping module 818, automation controller 820, media playback manager 822, motion controller 824, and tracking service 826 are the respective mapping module 228, automation controller 230, media playback manager 232, motion controller 234, and tracking service 236 that are implemented by the computing device 202, such as a software application and/or as hardware components in the computing device. In implementations, the mapping module 818, the automation controller 820, the media playback manager 822, the motion controller 824, and the tracking service 826 may include independent processing, memory, and logic components as a computing and/or electronic device integrated with the example device 800.

The example device 800 can also include a microphone 828 and/or camera devices 830, as well as motion sensors 832, such as may be implemented as components of an inertial measurement unit (IMU). The motion sensors 832 can be implemented with various sensors, such as a gyroscope, an accelerometer, and/or other types of motion sensors to sense motion of the device. The motion sensors 832 can generate sensor data vectors having three-dimensional parameters (e.g., rotational vectors in x, y, and z-axis coordinates) indicating location, position, acceleration, rotational speed, and/or orientation of the device. The example device 800 can also include one or more power sources 834, such as when the device is implemented as a wireless device and/or mobile device. The power sources may include a charging and/or power system, and can be implemented as a flexible strip battery, a rechargeable battery, a charged super-capacitor, and/or any other type of active or passive power source.

The example device 800 can also include an audio and/or video processing system 836 that generates audio data for an audio system 838 and/or generates display data for a display system 840. The audio system and/or the display system may include any types of devices or modules that generate, process, display, and/or otherwise render audio, video, display, and/or image data. Display data and audio signals can be communicated to an audio component and/or to a display component via any type of audio and/or video connection or data link. In implementations, the audio system and/or the display system are integrated components of the example device 800. Alternatively, the audio system and/or the display system are external, peripheral components to the example device.

Although implementations for UWB accessory for a wireless device have been described in language specific to features and/or methods, the appended claims are not necessarily limited to the specific features or methods described. Rather, the specific features and methods are disclosed as example implementations for UWB accessory for a wireless device, and other equivalent features and methods are intended to be within the scope of the appended claims. Further, various different examples are described and it is to be appreciated that each described example can be implemented independently or in connection with one or more other described examples. Additional aspects of the techniques, features, and/or methods discussed herein relate to one or more of the following:

A wireless device, comprising: an attachable ultra-wideband (UWB) accessory with a UWB radio, the attachable UWB accessory configured to receive UWB ranging data from UWB radios in an environment; and a Bluetooth low energy (BLE) interface configured to interface the attachable UWB accessory with the wireless device.

Alternatively or in addition to the above described wireless device, any one or combination of: the attachable UWB accessory is configured for wireless communication with radio devices of the wireless device. The attachable UWB accessory is configured to utilize BLE for UWB out-of-band communications. The attachable UWB accessory is configured for near field communication (NFC). A mapping module implemented at least partially in hardware and configured to determine a location of the wireless device in the environment based in part on the UWB ranging data received by the attachable UWB accessory. The attachable UWB accessory is associated to a user of the wireless device while the attachable UWB accessory is attached to the wireless device. The attachable UWB accessory is configured for attachment to a different wireless device, and the attachable UWB accessory is provisioned and associated with a user of the different wireless device while attached to the different wireless device. The attachable UWB accessory is detachable and operable as at least one of a key fob or a security badge while detached from the wireless device. The attachable UWB accessory is operable with the wireless device while detached from the wireless device and proximate the wireless device.

An attachable ultra-wideband (UWB) accessory, comprising: an ultra-wideband (UWB) radio to communicate with UWB radios associated with respective devices in an environment; at least one wireless interface to wirelessly communicate with radio devices of a wireless device to which the attachable UWB accessory is attached; and a micro-controller configured to receive UWB ranging data from the UWB radios.

Alternatively or in addition to the above described attachable UWB accessory, any one or combination of: the attachable UWB accessory configured to utilize Bluetooth low energy (BLE) for UWB out-of-band communications. The attachable UWB accessory configured for near field communication (NFC). The attachable UWB accessory is associated to a user of the wireless device while the attachable UWB accessory is attached to the wireless device. The attachable UWB accessory configured for attachment to a different wireless device, and the attachable UWB accessory is provisioned and associated with a user of the different wireless device while attached to the different wireless device. The micro-controller is configured to determine a location of the wireless device in the environment based on the UWB ranging data received from the UWB radios. The attachable UWB accessory is detachable and operable as at least one of a key fob or a security badge while detached from the wireless device.

A method, comprising: interfacing an attachable ultra-wideband (UWB) accessory to a wireless device, the attachable UWB accessory configured with a UWB radio; receiving UWB ranging data from UWB radios in an environment; determining a location of the wireless device in the environment based in part on the UWB ranging data received by the attachable UWB accessory.

Alternatively or in addition to the above described method, any one or combination of: the method further comprising utilizing Bluetooth low energy (BLE) for UWB out-of-band communications with the wireless device. The method further comprising operating as at least one of a key fob or a security badge while the attachable UWB accessory is detached from the wireless device. The method further comprising provisioning the attachable UWB accessory to a different wireless device while attached to the different wireless device.

The invention claimed is:

1. A wireless device, comprising:
an attachable ultra-wideband (UWB) accessory with a UWB radio, the attachable UWB accessory configured to:
receive UWB ranging data from UWB radios in an environment;
attach to the wireless device and communicate ranging updates to the wireless device, the ranging updates indicating a position of a UWB tag in the environment; and
attach to a different wireless device and communicate additional ranging updates to the different wireless device; and
a Bluetooth low energy (BLE) interface configured to interface the attachable UWB accessory with the wireless device or the different wireless device.

2. The wireless device of claim 1, wherein the attachable UWB accessory is configured for wireless communication with radio devices of the wireless device.

3. The wireless device of claim 1, wherein the attachable UWB accessory is configured to utilize BLE for UWB out-of-band communications.

4. The wireless device of claim 1, wherein the attachable UWB accessory is configured for near field communication (NFC).

5. The wireless device of claim 1, further comprising a mapping module implemented at least partially in hardware and configured to determine a location of the wireless device in the environment based in part on the UWB ranging data received by the attachable UWB accessory.

6. The wireless device of claim 1, wherein the attachable UWB accessory is associated to a user of the wireless device while the attachable UWB accessory is attached to the wireless device.

7. The wireless device of claim 1, wherein the attachable UWB accessory is detachable and operable as at least one of a key fob or a security badge while detached from the wireless device.

8. The wireless device of claim 1, wherein the attachable UWB accessory is operable with the wireless device while detached from the wireless device and proximate the wireless device.

9. An attachable ultra-wideband (UWB) accessory, comprising:
a UWB radio to communicate with UWB radios associated with respective devices in an environment;
at least one wireless interface to wirelessly communicate ranging updates, including a position of a UWB tag in the environment, with radio devices of a wireless device to which the attachable UWB accessory is attached, the attachable UWB accessory configured for attachment and provisioned to a different wireless device to communicate additional ranging updates to the different wireless device while attached to the different wireless device; and
a micro-controller configured to receive UWB ranging data from the UWB radios.

10. The attachable UWB accessory of claim 9, further configured to utilize Bluetooth low energy (BLE) for UWB out-of-band communications.

11. The attachable UWB accessory of claim 9, further configured for near field communication (NFC).

12. The attachable UWB accessory of claim 9, wherein the attachable UWB accessory is associated to a user of the wireless device while the attachable UWB accessory is attached to the wireless device.

13. The attachable UWB accessory of claim 9, wherein the micro-controller is configured to determine a location of the wireless device in the environment based on the UWB ranging data received from the UWB radios.

14. The attachable UWB accessory of claim 9, wherein the attachable UWB accessory is detachable and operable as at least one of a key fob or a security badge while detached from the wireless device.

15. A method, comprising:
interfacing an attachable ultra-wideband (UWB) accessory to a wireless device, the attachable UWB accessory configured with a UWB radio;
receiving UWB ranging data from UWB radios in an environment;
determining a location of the wireless device in the environment based in part on the UWB ranging data received by the attachable UWB accessory;

communicating ranging updates to the wireless device, the ranging updates indicating a position of a UWB tag in the environment;
provisioning the attachable UWB accessory to a different wireless device while attached to the different wireless device; and
communicating additional ranging updates to the different wireless device.

16. The method of claim 15, further comprising:
utilizing Bluetooth low energy (BLE) for UWB out-of-band communications with the wireless device.

17. The method of claim 15, further comprising:
operating as at least one of a key fob or a security badge while the attachable UWB accessory is detached from the wireless device.

18. The method of claim 15, wherein the wireless device is configured for near field communication (NFC) with the attachable UWB accessory.

19. The method of claim 15, further comprising:
associating the attachable UWB accessory to a user of the wireless device while the attachable UWB accessory is attached to the wireless device.

20. The method of claim 15, further comprising:
operating with the wireless device while detached from the wireless device and proximate the wireless device.

* * * * *